(12) United States Patent
Smith et al.

(10) Patent No.: US 10,407,095 B2
(45) Date of Patent: Sep. 10, 2019

(54) DETACHABLE MULTI-AXLE ASSEMBLY

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: Entro Industries, Inc., Hillsboro, OR (US)

( * ) Notice: Subject to any disclaimer, the term of this patent is extended or adjusted under 35 U.S.C. 154(b) by 199 days.

(21) Appl. No.: 15/450,374

(22) Filed: Mar. 6, 2017

(65) Prior Publication Data

US 2017/0259848 A1    Sep. 14, 2017

Related U.S. Application Data

(60) Provisional application No. 62/305,903, filed on Mar. 9, 2016.

(51) Int. Cl.
*B62D 13/02*    (2006.01)

(52) U.S. Cl.
CPC .................. *B62D 13/02* (2013.01)

(58) Field of Classification Search
CPC ............ B62D 13/02; B60D 1/44; B62K 3/12
See application file for complete search history.

(56) References Cited

U.S. PATENT DOCUMENTS

| | | | |
|---|---|---|---|
| 2,967,492 A * | 1/1961 | Keener | B60P 3/073 248/159 |
| 3,512,597 A | 5/1970 | Baron | |
| 4,058,065 A | 11/1977 | Seifert | |
| 4,135,614 A * | 1/1979 | Penterman | B65G 41/008 198/306 |
| 4,252,204 A | 2/1981 | Bishop | |
| 6,923,278 B2 | 8/2005 | Mulhern | |
| 7,497,457 B2 | 3/2009 | Jamieson | |
| 8,215,657 B1 | 7/2012 | Gist | |
| 8,272,493 B1 * | 9/2012 | Grengs | B65G 33/24 198/300 |
| 8,646,976 B2 | 2/2014 | Stoik | |

(Continued)

FOREIGN PATENT DOCUMENTS

| | | |
|---|---|---|
| EP | 0 000 281 A1 | 1/1979 |
| WO | 01/54867 A1 | 8/2001 |

OTHER PUBLICATIONS

Schwabe Williamson & Wyatt, PC: Listing of Related cases dated Mar. 4, 2019; 1 page.

*Primary Examiner* — James A English
(74) *Attorney, Agent, or Firm* — Schwabe Williamson & Wyatt

(57) ABSTRACT

A multi-axle assembly includes an axle frame configured to move in a first travel configuration, a first axle assembly attached to the axle frame and including a first axle, and a second axle assembly attached to the axle frame and including a second axle. A common axis of rotation passes through both the first axle and the second axle in the first travel configuration. A first axle mount that operably couples the first axle assembly to the axle frame, and a second axle mount that operably couples the second axle assembly to the axle frame. Both the first axle assembly and the second axle assembly may be repositioned to a second travel configuration in which the first axle and the second axle are rotationally offset from the common axis of rotation.

20 Claims, 15 Drawing Sheets

(56) References Cited

U.S. PATENT DOCUMENTS

| | | | | |
|---|---|---|---|---|
| 8,739,956 B2* | 6/2014 | Smith | ............... | B65G 41/008 |
| | | | | 180/6.48 |
| 9,187,024 B2* | 11/2015 | Bojsen | ............... | B62D 13/02 |
| 2001/0035624 A1 | 11/2001 | Hickling | | |
| 2007/0126196 A1 | 6/2007 | Klahn | | |
| 2008/0308359 A1 | 12/2008 | Waltz | | |
| 2009/0145721 A1* | 6/2009 | Toews | ............... | A01D 75/008 |
| | | | | 198/300 |
| 2012/0048674 A1* | 3/2012 | Smith | ............... | B65G 41/002 |
| | | | | 198/306 |
| 2014/0353936 A1 | 12/2014 | Preijert | | |
| 2016/0176427 A1* | 6/2016 | Liao | ............... | B62B 3/025 |
| | | | | 280/642 |
| 2017/0022765 A1 | 1/2017 | Csergei | | |
| 2017/0172823 A1 | 6/2017 | Ishikawa | | |
| 2017/0232810 A1 | 8/2017 | Smith | | |

* cited by examiner

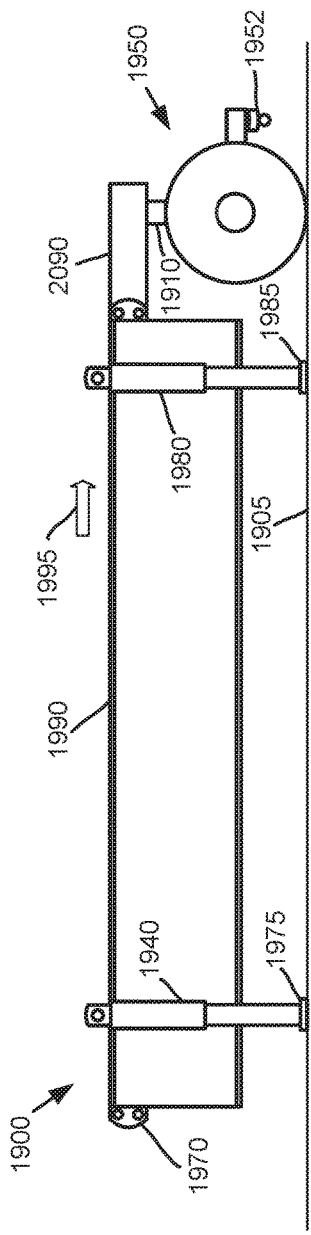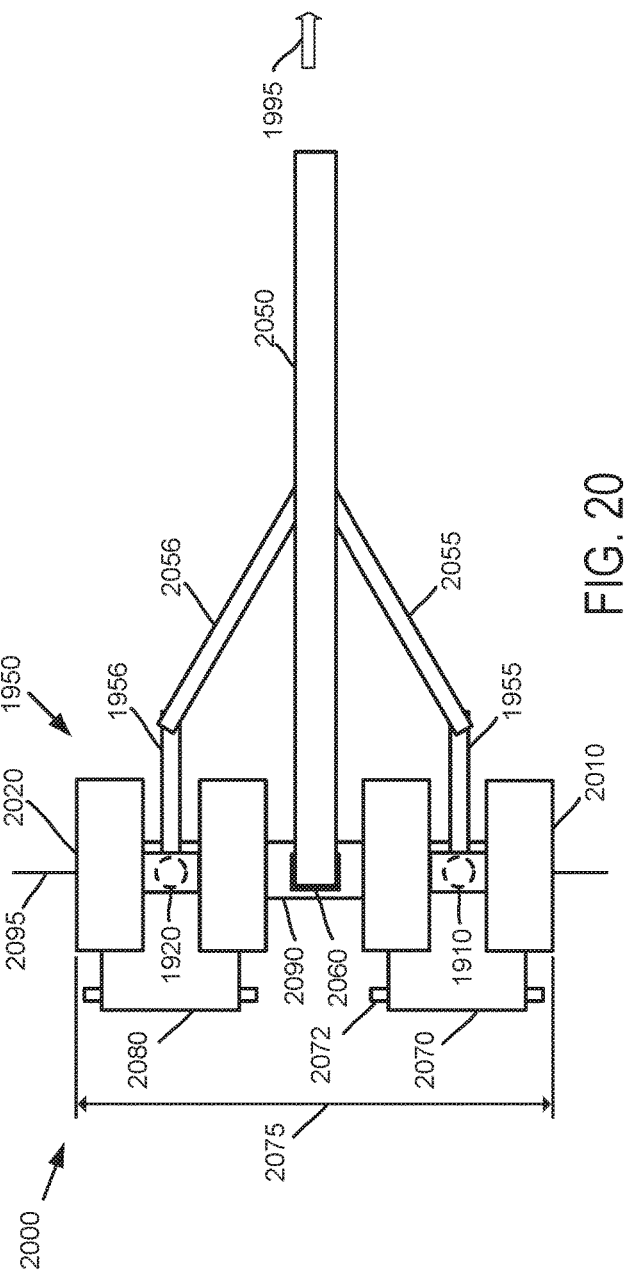

DETACHABLE MULTI-AXLE ASSEMBLY

STATEMENT OF RELATED MATTERS

This application claims priority to U.S. Provisional 62/305,903 filed on Mar. 9, 2016 and entitled Detachable Multi-axle Assembly, the contents of which are herein incorporated by reference in their entirety.

TECHNICAL FIELD

This disclosure generally relates to systems, devices, apparatus, and methods associated with an axle assembly for a load transporting system.

BACKGROUND

Moving extremely heavy loads has generally been a complicated task because of the large forces involved in lifting and transporting the heavy loads. In known mounting structures, large loads may be transported by disassembling or breaking up the load or the mounting structure into multiple smaller sections and/or loads. However, this breakdown and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines may be configured to move the heavy loads over small distances in incremental stages. For example, walking machines may be used to move large structures, such as oil rigs, in order to position them over pre-drilled pipes in oil fields.

In other types of systems, heavy duty axle assemblies have been developed to transport and/or support heavy loads. The axle assemblies may include hydraulic lift functionality, such as a hydraulic cylinder that is typically welded directly to the axle assembly to provide a rigid connection that can withstand the resulting stress from carrying the heavy load.

Locations where oil rigs operate may provide for extreme temperature variations, humidity, dust and/or other particulates, and other environmental conditions that, in addition to the wear and tear that results from moving the heavy loads, may result in frequent maintenance or repair of the load transport systems. For example, it is not uncommon for a lift cylinder or cylinder rod to fail and need to be replaced and/or serviced while a transportable oil rig is at the work site.

In situations where the lift cylinder rod fails, the lift cylinder rod together with the axle assembly is typically removed from operation and replaced with an entirely different assembly. This, of course, requires the operator of the oil rig to have a spare axle assembly on hand, and typically the old axle assembly would be transported to a repair facility so that the hydraulic cylinder can be removed from the axle assembly and be repaired. Even in situations where on-site maintenance of the lift cylinder rod may be performed, e.g., by torch cutting the weldment, the physical removal of the lift cylinder rod from the axle assembly may result in a material weakening of the metal plates or other components of the weldment, which may lead to further failures of the axle assembly or components thereof.

When moving the mounting structure and/or loads over relatively large distances, various components and superstructures may be disassembled into multiple smaller sections and/or loads. The smaller loads may be transported over highways or other less developed roads by moving vehicles such as semi-trucks, flat-bed trucks, tow truck, and other towing vehicles. Even when the load and structure have been disassembled, certain components may nevertheless exceed allowable width restrictions that may be in place. This may require the towing vehicle to be accompanied by pilot vehicles advising other drivers of the wide load, or may restrict which roads the wide load may be transported on.

The present invention addresses these and other problems.

SUMMARY

A removable axle assembly is disclosed herein, as comprising a removable axle assembly for transporting a load bearing frame. An axle mounting structure may be configured to be removably attached to an axle mount. The axle mounting structure may include an inner surface that aligns with a non-vertical tapered surface of the axle mount. One or more fastening devices may be attached to a clamping structure. In response to securing the one or more fastening devices, the clamping structure may be configured to exert a compression force that maintains contact between the tapered surface of the frame support structure and the inner surface of the axle mounting structure.

A removable axle assembly is disclosed herein, as comprising an axle and an axle mounting structure operably coupled to the axle. The axle mounting structure may be configured to be removably attached to an axle mount, and the axle mounting structure may comprise an inner surface that aligns with a non-vertical tapered surface of the axle mount. The axle assembly may additionally comprise means for securing the tapered surface of the axle mount to the inner surface of the axle mounting structure, and means for exerting a compression force to maintain contact between the tapered surface of the axle mount and the inner surface of the axle mounting structure.

A method for removably attaching an axle assembly is disclosed herein. The method may comprise positioning a lower end of the axle mount within an axle mounting structure. The axle mounting structure may comprise an inner surface that aligns with a non-vertical tapered surface of the axle mount. Additionally, one or more fastening devices may be attached to a clamping structure. The clamping structure may exert a compression force that maintains contact between the tapered surface of the axle mount and the inner surface of the axle mounting structure. The compression force may result from securing the one or more fastening devices.

An axle assembly is disclosed herein. The axle assembly may comprise an axle and an axle mount frame configured to be attached to the axle. A position device may project from an outer surface of the axle, and a positional mounting structure may be configured to locate an initial position of the axle relative to the axle mount frame. The axle assembly may further comprise an axle adjustment device having an inclined surface that is configured to contact the position device. A compressive force may be exerted between the axle mount frame and the positional mounting structure when the axle adjustment device is placed in contact with the position device.

A detachable multi-axle assembly is disclosed herein. The multi-axle assembly may be configured to be transported in a first travel configuration, in which two load wheel assemblies may be substantially located side-by-side to each other during travel. The multi-axle assembly may also be configured to movein a second travel configuration, in which two load wheel assemblies may be substantially located in-line with each other during travel.

BRIEF DESCRIPTION OF THE DRAWINGS

FIG. 19 illustrates a side view of an example load transport apparatus with a multi-axle assembly.

FIG. 20 illustrates a plan view of the multi-axle assembly of FIG. 19 in a first travel configuration.

DETAILED DESCRIPTION

A support structure for carrying a heavy load, such as an oil rig, may comprise one or more load transporting apparatus or systems that are used for transporting the support structure. Such loads may be as heavy as several thousand tons and may be sequentially positioned very precisely over spaced-apart well bores, for example. The load transporting apparatuses or systems may include one or more axle assemblies.

Figure 1:
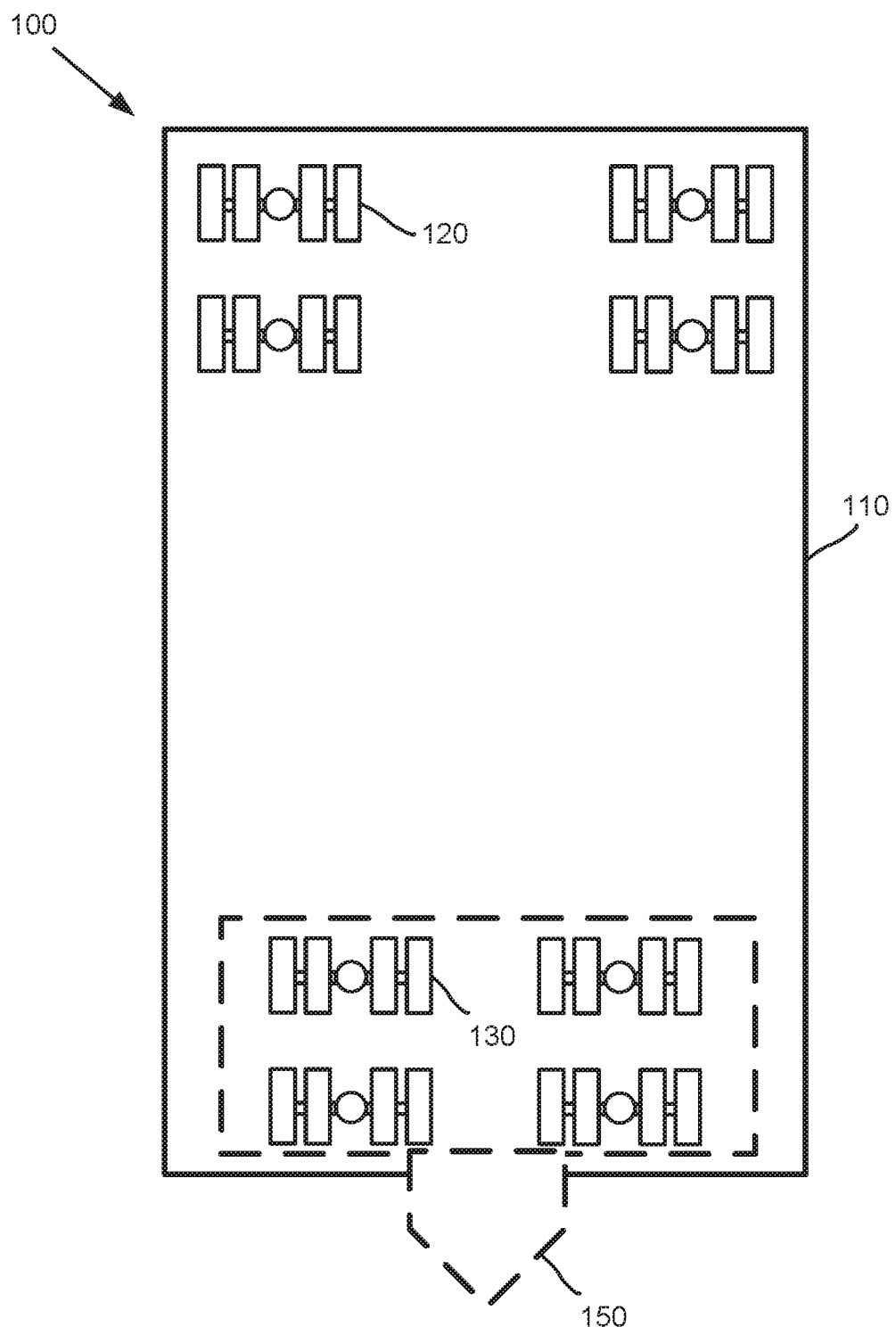
FIG. 1 illustrates a planar view of an example transportable mounting structure.

FIG. 1 illustrates a planar view of an example transportable mounting structure 100. The mounting structure 100 may comprise a platform 110 or heavy duty trailer, for example. A plurality of load transport apparatus, such as first load transport apparatus 120, may be connected to the platform 110 at one or both ends. For example, first load transport apparatus 120 may be connected at a front end of platform 110 and a second load transport apparatus 130 may be connected at a rear end of platform 110. Additional load transport structures may be connected at the corresponding left and right sides of either end. Depending on the size of mounting structure 100 and/or the weight of the load being transported on platform 110, additional load transport devices may be connected at one or more positions along the length and/or width of mounting structure.

First load transport apparatus 120 may be rigidly and/or directly attached to platform 110 as a stand-alone assembly. In some examples, second load transport apparatus 130 may be connected to platform 110 via a trailer assembly 150 (shown in dashed lines) comprising a plurality of load transport apparatus. In some examples, trailer assembly 150 may comprise a load dividing trailer, a "jeep" trailer, other types of trailers, or any combination thereof.

Trailer assembly 150 may be configured to mount to a tow vehicle (not shown) and in some examples, the entire trailer assembly 150 may be configured to pivot or turn with respect to platform 110 during transport of and/or maneuvering mounting structure 100. One or both of first load transport apparatus 120 and second load transport apparatus 130 may comprise an axle assembly and/or a lift device.

Figure 2:
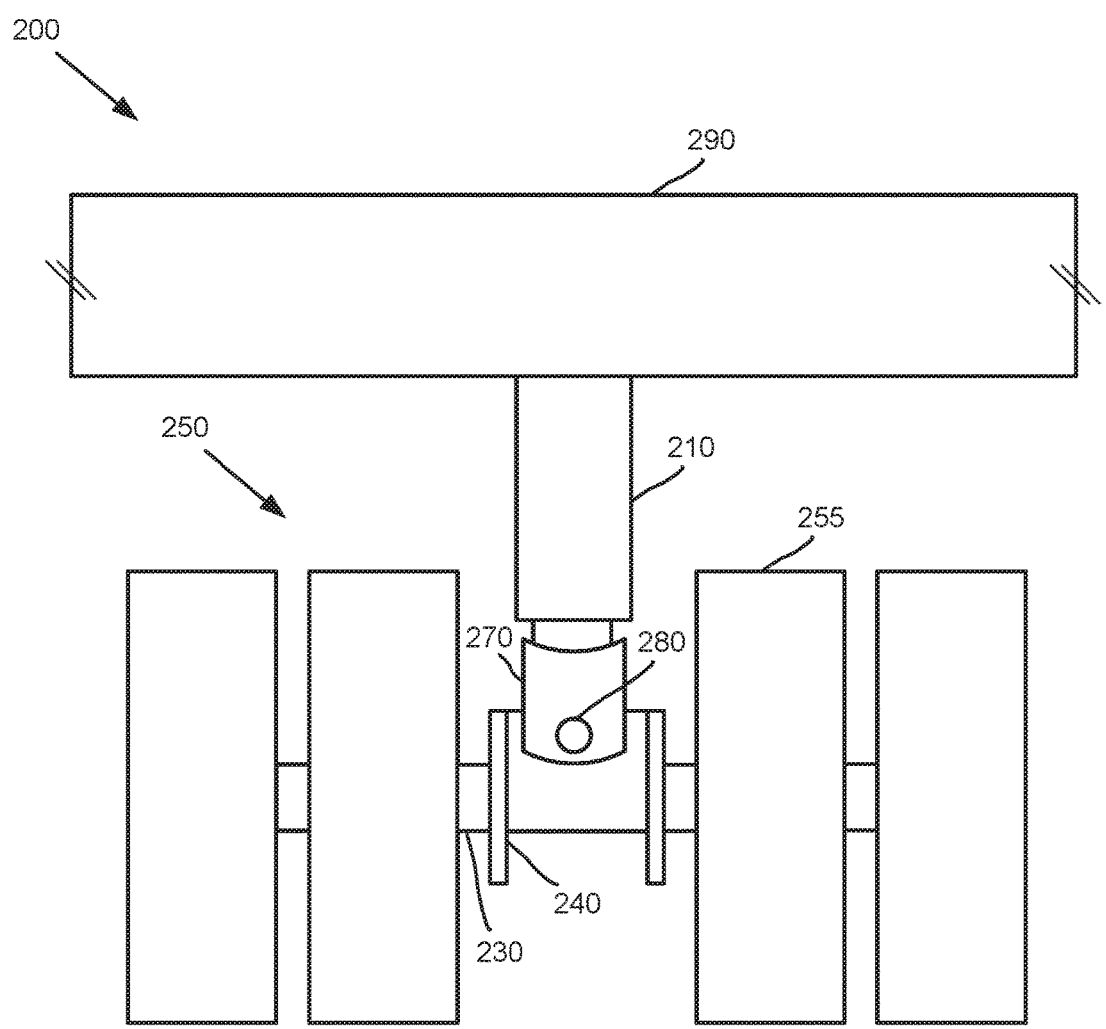
FIG. 2 illustrates a front view of an example load transport apparatus comprising a removable axle assembly.

FIG. 2 illustrates a front view of an example load transport apparatus 200 comprising a removable axle assembly 250. A lift apparatus 210 may be coupled to a load bearing support structure 290. Axle assembly 250 may be operably coupled to lift apparatus 210 by coupling apparatus 270.

Lift apparatus 210 may additionally be operably coupled to axle assembly 250 via coupling apparatus 270 and/or by an axle mount frame 240. Axle assembly 250 may comprise an axle 230 that passes through and/or is rotationally coupled to axle mount frame 240. Four wheels 255 are shown as being connected to axle 230, although more or fewer wheels associated with axle assembly 250 are contemplated herein.

In some examples, axle assembly 250 may be configured to rotate or articulate about an articulating connection 280 of coupling apparatus 270. Articulating connection 280 may provide for the articulation of axle assembly 250 about an axis of rotation which is substantially perpendicular to the axis of rotation of axle 230.

Figure 3:
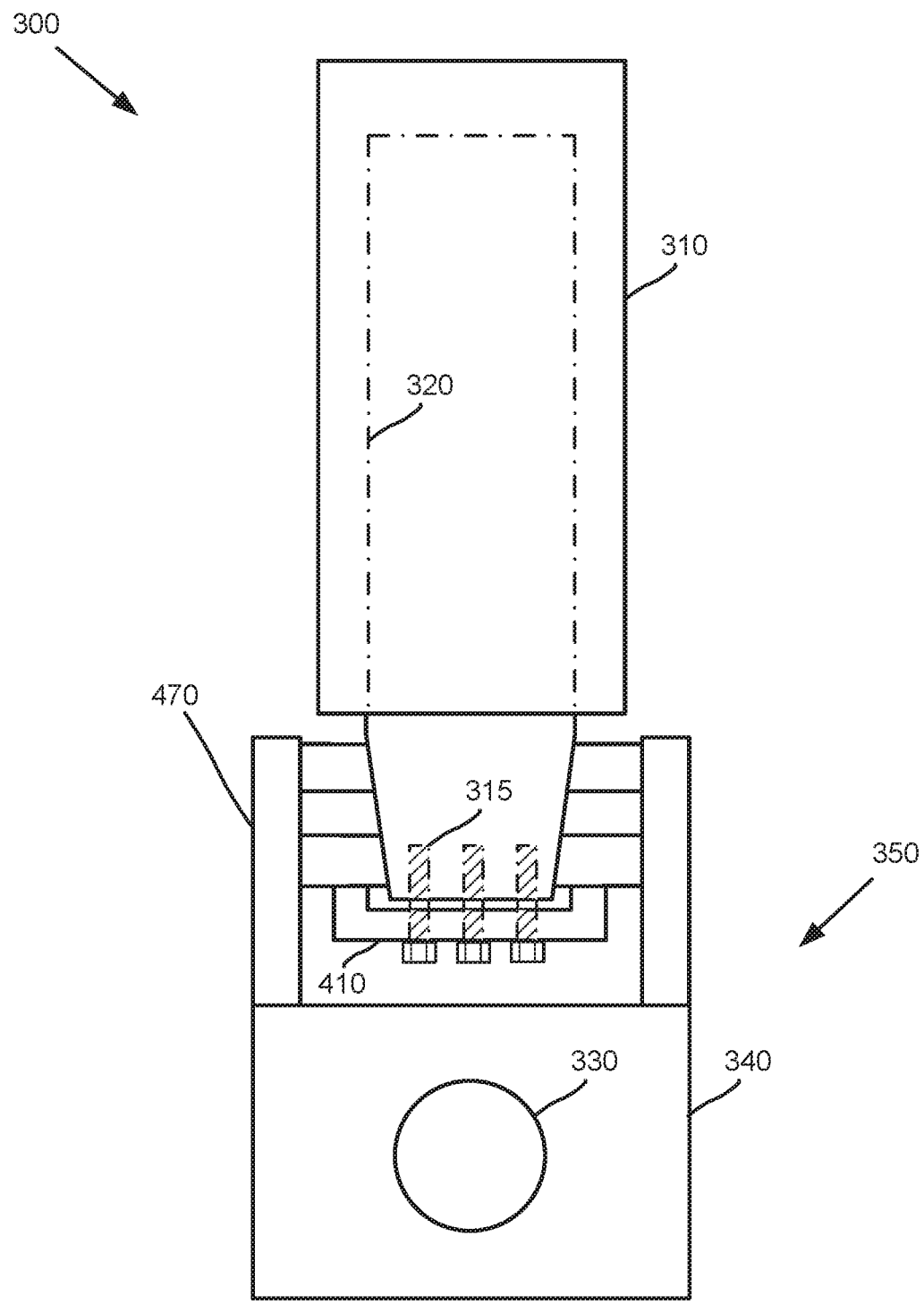
FIG. 3 illustrates a side view of an example load transport apparatus comprising an axle assembly removably attached to a lift apparatus.

FIG. 3 illustrates a partial cross-sectional side view of an example load transport apparatus 300 comprising an axle assembly 350 removably attached to a lift apparatus 310. Lift apparatus 310 may comprise a lift cylinder and a lift cylinder rod 320 (partially shown in dashed lines) operably coupled to axle assembly 350 by a coupling apparatus 470. Lift cylinder rod 320 may comprise and/or be attached to a piston. In some examples, coupling apparatus 470 may be configured similarly as coupling apparatus 270 of FIG. 2. Additionally, axle assembly 350 may comprise an axle 330 and an axle mount frame 340, similar to axle 230 and axle mount frame 240 of FIG. 2.

Coupling apparatus 470 may comprise one or more fasteners 315, such as a bolt, a clamp, a nut, a screw fitting, a pin, a clip, other types of fastening and/or attachment devices, or any combination thereof. Additionally, fasteners 315 may be configured to rigidly fasten the lower end of lift cylinder rod 320 to coupling apparatus 470. For example, coupling apparatus 470 may comprise a clamping plate 410 that is configured to draw lift cylinder rod 320 into direct contact with coupling apparatus 470 as fasteners 315 are tightened and/or otherwise secured. Fasteners 315 are illustrated as passing through clamping plate 410 and into the lower end of lift cylinder rod 320.

Figure 4:
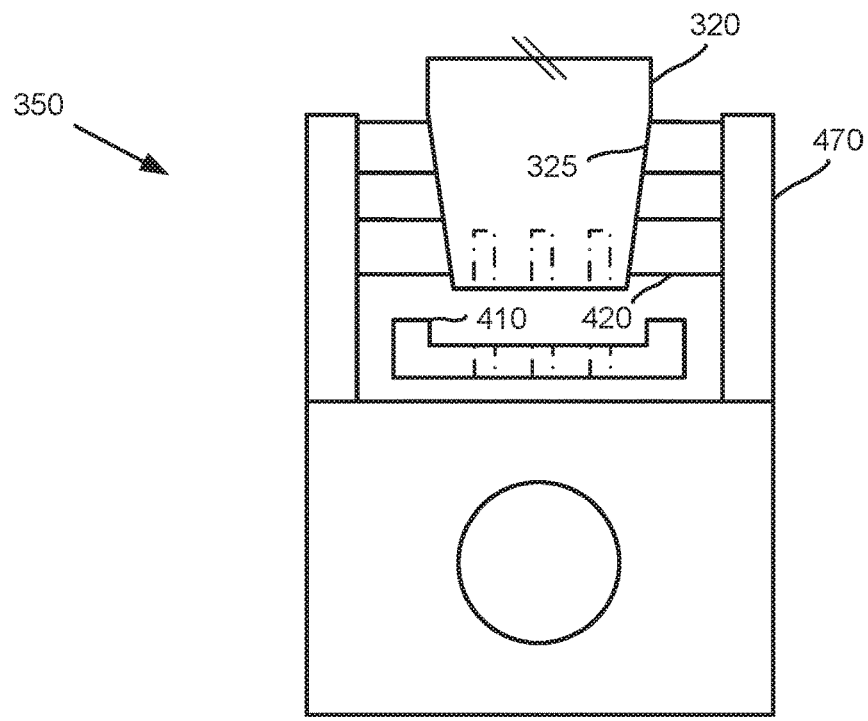
FIG. 4 illustrates the example axle assembly of FIG. 3 partially disconnected from the lift apparatus.

FIG. 4 illustrates the example axle assembly 350 of FIG. 3 partially disconnected from the lift apparatus. Clamping plate 410 is shown having been disconnected from the lower end of lift cylinder rod 320 following the removal of fasteners 315 (FIG. 3), such that the upper surface of clamping plate 410 is no longer in contact with the lower surface of one or more mounting structures 420 of coupling apparatus 470. The one or more mounting structures 420 may be configured to provide a fitted seat or receptacle for the lower end of lift cylinder rod 320.

Lift cylinder rod 320 may be configured with a tapered or angled surface 325 which narrows to a smaller diameter lower end that attaches to clamping plate 410 via fasteners 315 (FIG. 3). The lower portion of lift cylinder rod 320 may comprise a partial cone-shaped exterior surface. The one or more mounting structures 420 may similarly include a tapered or angled surface that align or mate with the tapered surface 325 of lift cylinder rod 320. The one or more mounting structures 420 may be configured as a ring that encircles the circumference of lift cylinder rod 320.

Coupling apparatus 470 may comprise two mounting rings that are configured to contact support lift cylinder rod 320 at two different elevations along tapered surface 325. By securing and/or tightening clamping plate 410 to the lower surface of the one or more mounting structures 420, the tapered surface 325 of lift cylinder rod 320 may be pressed against and/or firmly secured against the corresponding angled surface(s) of the one or more mounting structures 420.

Figure 5:
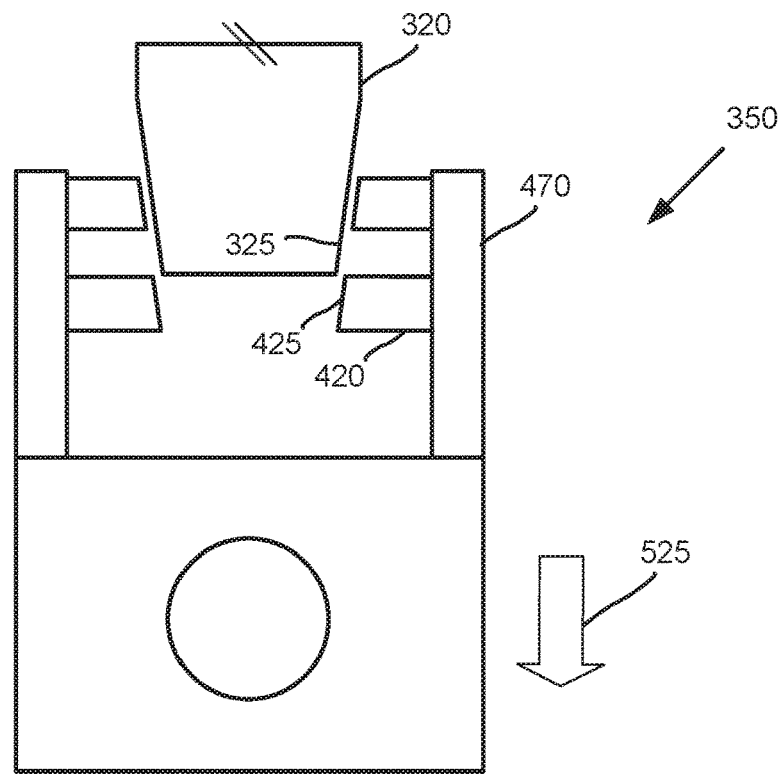
FIG. 5 illustrates the example axle assembly of FIG. 3 in the process of being separated from the lift apparatus.

FIG. 5 illustrates the example axle assembly 350 of FIG. 3 in the process of being separated from the lift apparatus. In the illustrated example, axle assembly 350 is shown being moved away from lift cylinder rod 320 in the generally downward direction shown by arrow 525, such that tapered surface 325 is no longer in contact with a corresponding angled surface 425 of the one or more mounting structures 420. The tapered surface 325 of lift cylinder rod 320 is configured to facilitate the insertion and/or removal of lift cylinder rod 320 from coupling apparatus 470. For example, the tapered surface 325 prevents lift cylinder rod 320 from becoming unintentionally wedged within the one or more mounting structures 420, and that otherwise might make withdrawal of lift cylinder rod 320 difficult and/or require excessive force for removal which might damage one or more components.

Although arrow 525 indicates a relative downward movement of axle assembly 350 with respect to lift cylinder rod 320, in some examples it may be more convenient to raise the lift cylinder rod 320 and/or entire lift apparatus up and out of coupling apparatus 470, while the wheels associated with axle assembly 350 are resting on the ground or other support surface. In still other examples, axle assembly 350 may be moved in a lateral direction, or sideways, from lift cylinder rod 320 after being disconnected.

Figure 6:
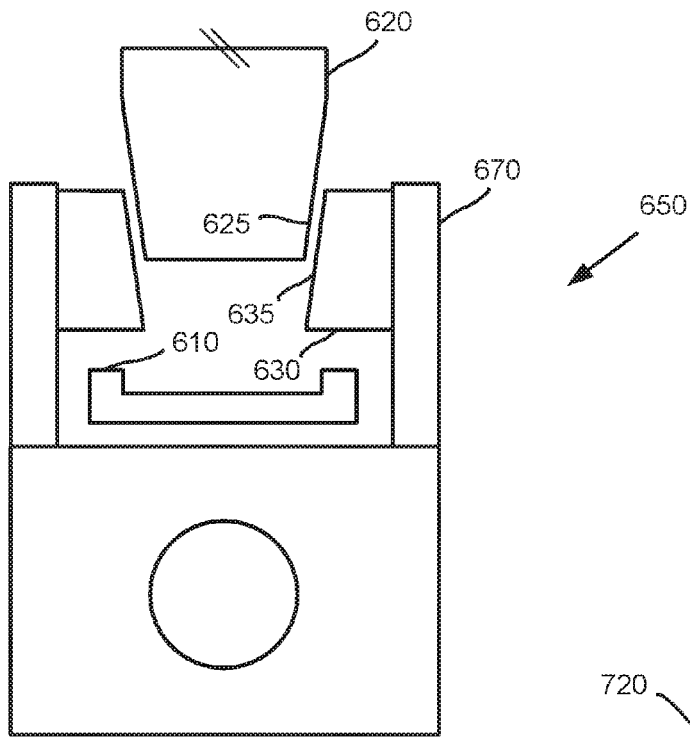
FIG. 6 illustrates an example load transport system comprising a removable axle assembly.

FIG. 6 illustrates an example load transport system comprising a removable axle assembly 650 shown in a partially exploded view. Axle assembly 650 may be removably coupled to an axle mount 620. The axle mount 620 may be connected to a load bearing frame or platform, such as load bearing support structure 290 and/or platform 110 (FIG. 1). Axle mount 620 may comprise a tapered lower end, illustrated as tapered surface 625, which gradually decreases in diameter as compared to the main or upper body of the axle mount 620. Tapered surface 625 may be generally conical or include another tapered surface such as square, pyramid, or other geometric shape.

In some examples, axle mount 620 may comprise one or more beams, pillars, shafts, struts, linkage, other types of mounting and/or support structures, such as an "A-arm" used in the automotive industry, or any combination thereof. In still other examples, axle mount 620 may comprise a hydraulic lift cylinder rod and/or piston, similar to cylinder rod 320 of the lift apparatus 310 (FIG. 3).

Axle assembly 650 may comprise a coupling apparatus 670 including an axle mounting structure 630. Axle mounting structure 630 may comprise an angled surface 635 approximately aligned with the tapered surface 625 associated with axle mount 620. Axle assembly 650 may be removably coupled to axle mount 620 such that the tapered surface 635 of axle mounting structure 630 comes into contact with the angled surface 635 of axle mount 620. Axle mounting structure 630 may comprise a disc, a ring, or a plate that is configured to essentially surround the axle mount 620 about the circumference of tapered surface 625. Angled surface 635 may be formed on a through-hole of axle mounting structure 630.

In some examples, substantially the entire angled surface 635 of axle mounting structure 630 may come into direct contact with the tapered surface 625 of axle mount 620. In other examples, a majority of the angled surface 635 of axle mounting structure 630 may come into direct contact with the tapered surface 625 of axle mount 620.

A clamping plate 610 may be used to secure axle mounting structure 630 to axle mount 620. Clamping plate 610 may be configured similarly as clamping plate 410 (FIG. 3). For example, one or more fastening devices may be configured to secure and/or tighten clamping plate 610 to axle mounting structure 630 and/or to axle mount 620.

Figure 7:
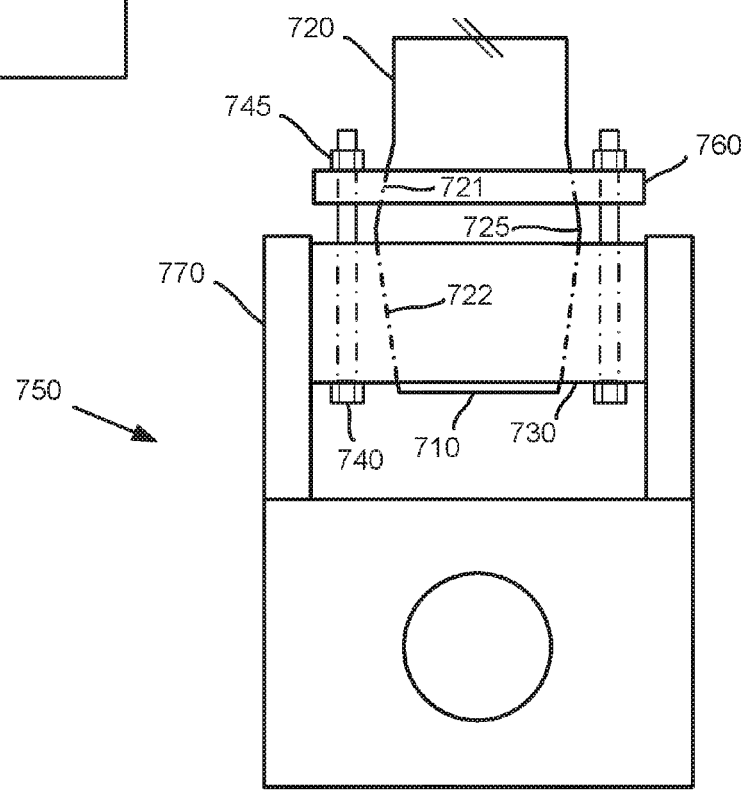
FIG. 7 illustrates another example load transport system comprising a removable axle assembly.

FIG. 7 illustrates another example load transport system comprising a removable axle assembly 750. An axle mount 720 may be connected to a load bearing frame or platform, and additionally may comprise two tapered surfaces, illustrated as a first tapered surface 721 and a second tapered surface 722. First tapered surface 721 may gradually increase in diameter from the main or upper body of axle mount 720 to a raised portion 725. Second tapered surface 722 may gradually decrease in diameter from the raised portion 725 towards the lower end 710 of axle mount 710. In some example, raised portion 725 may form a ridge and/or be associated with a maximum diameter of axle mount 720.

First tapered surface 721 may be configured to contact a clamping device 760. Clamping device 760 may be configured as a disc, a ring, a washer, or a plate which at least partially surrounds axle mount 720. Additionally, one or more fasteners 740, such as a bolt, a clamp, a nut, a screw fitting, a pin, a clip, other types of fastening and/or attachment devices, or any combination thereof, may be configured to rigidly fasten axle mount 720 to a coupling apparatus 770. For example, clamping device 760 may be configured to draw axle mount 720 into direct contact with an axle mounting structure 730 associated with coupling apparatus 770, as fasteners 740 are tightened and/or otherwise secured.

Second tapered surface 722 may be configured similarly as the one or more mounting structures 420 (FIG. 4), in that the second tapered surface 722 of axle mount 720 may be configured to contact a correspondingly angled surface of an axle mounting structure 730 associated with coupling apparatus 770.

Fasteners 740 are illustrated as passing through or into both clamping device 760 and axle mounting structure 730. One or more nuts 745 or other types of tensioning devices may be configured to adjust the tension provided by fasteners 740 as the nuts are tightened or loosened. Fasteners 740 may be configured to provide a compression force on the lower end of axle mount 720 between axle mounting structure 730 and clamping device 760. In some examples, axle mount 720 may comprise a load support frame, a lift cylinder, an axle linkage, other types of support structures, or any combination thereof.

Figure 8:
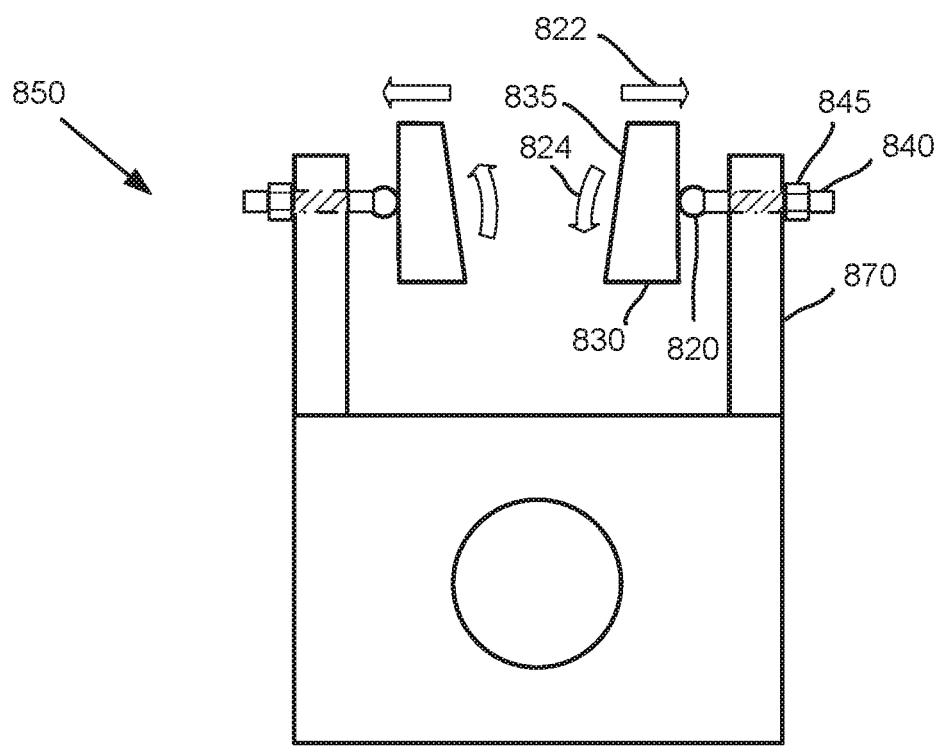
FIG. 8 illustrates yet a further example load transport system comprising a removable axle assembly.

FIG. 8 illustrates yet a further example load transport system comprising a removable axle assembly 850. Axle assembly 850 may be removably coupled to an axle mount, similar to axle mount 620 (FIG. 6), and/or to a lift apparatus, such as lift cylinder rod 320 (FIG. 3).

Axle assembly 850 may comprise a coupling system 870 including a plurality of mounting structures 830. The plurality of mounting structures 830 may comprise an angled surface 835. Additionally, coupling system 870 may comprise an adjustment device 840 configured to vary the position of the plurality of mounting structures 830 and/or to vary the angled surface 835.

In some examples adjustment device 840 may be moved laterally through a support plate of coupling system 870 to effectuate a corresponding lateral movement of one or more of the plurality of mounting structures 830 in the lateral direction 822. For example, the plurality of mounting structures 830 may be moved outward to accommodate a larger diameter axle mount and/or a larger diameter lift cylinder rod. Alternatively, the plurality of mounting structures 830 may be moved inward to accommodate a smaller diameter axle mount and/or a smaller diameter lift cylinder rod. A bolt 845 or other type of securing device may be configured to retain the position of the plurality of mounting structures 830 at a fixed distance from each other.

The plurality of mounting structures 830 may be rotated about a pivot 820 attached at an end of adjustment device 840 to vary one or more angles associated with angled surface 835. For example, the plurality of mounting structures 830 may be rotated downward to accommodate an axle mount and/or a lift cylinder rod having a tapered surface which only slightly deviates from vertical. Alternatively, the plurality of mounting structures 830 may be rotated upward to accommodate an axle mount and/or a lift cylinder rod having a tapered surface which deviates more substantially from vertical.

The position of the one or more mounting structures 830 may be adjusted so that a majority or substantially the entire angled surface 835 of the plurality of mounting structures 830 may come into direct contact with the tapered surface of a variety of different axle mounts and/or lift cylinder rods of varying sizes, diameters, or tapered angles.

In some examples, coupling system 870 may comprise and/or be configured to operate with a clamping device, such as clamping plate 410 (FIG. 3) or clamping device 760 (FIG. 7), and additionally, one or fastening devices such as fasteners 315 (FIG. 3) or fasteners 740 (FIG. 7).

Figure 9:
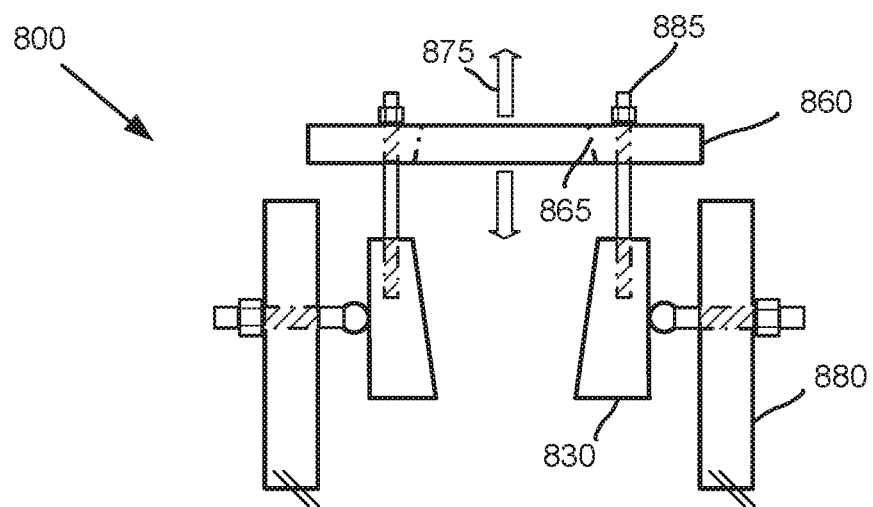
FIG. 9 illustrates an example variation of the load transport system of FIG. 8.

FIG. 9 illustrates an example variation 800 of the load transport system of FIG. 8. In this example, an upper clamping device 860 may be configured to work in conjunction with the adjustable position mounting structures 830. Upper clamping device 860 may be coupled to mounting structures 830 by a number of upper fasteners 885. Upper fasteners 885 may be configured to adjust the position of upper clamping device 860 in the vertical direction 875. For example, the distance between upper clamping device 860 and the mounting structures may be varied by moving upper clamping device 860 either up or down.

Upper clamping device 860 may comprise a disc or plate that is configured to essentially surround an axle mount and/or lift cylinder rod about its diameter. Additionally, upper clamping device 860 may comprise a through-hole 865 with tapered walls.

Figure 10:
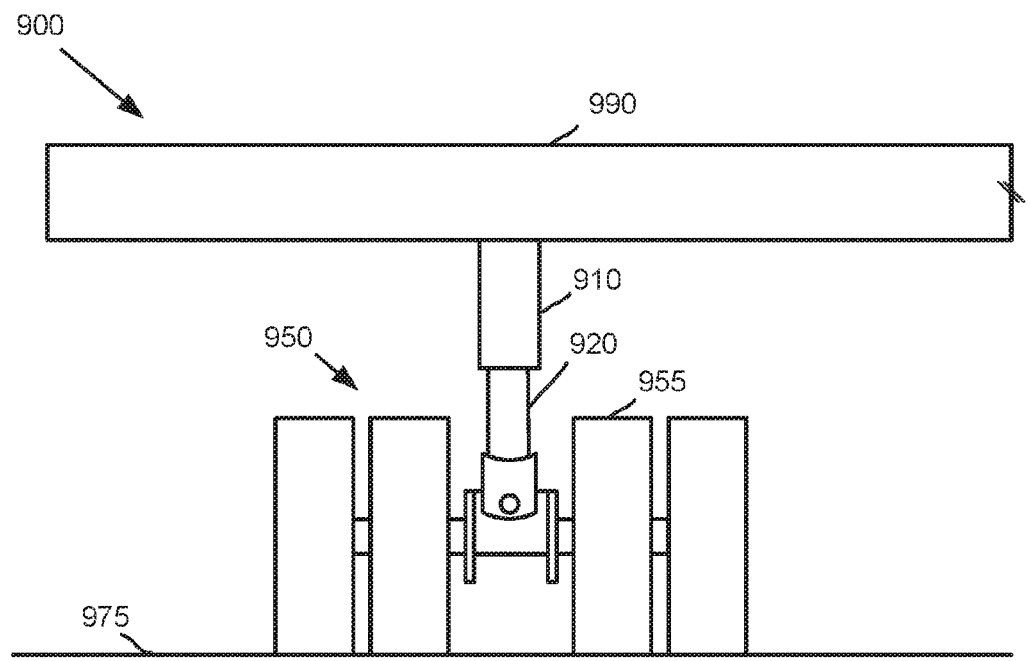
FIG. 10 illustrates an example load transport system in an elevated position.

FIG. 10 illustrates an example load transport system 900 in an elevated position. In the elevated position, a lift device 910 may be configured to extend a lift cylinder rod 920 such that a load bearing frame or platform 990 may be raised while the wheels 955 of an axle assembly 950 are located on the ground 975. In some examples, axle assembly 950 may be configured similarly as axle assembly 250 (FIG. 2).

Figure 11:
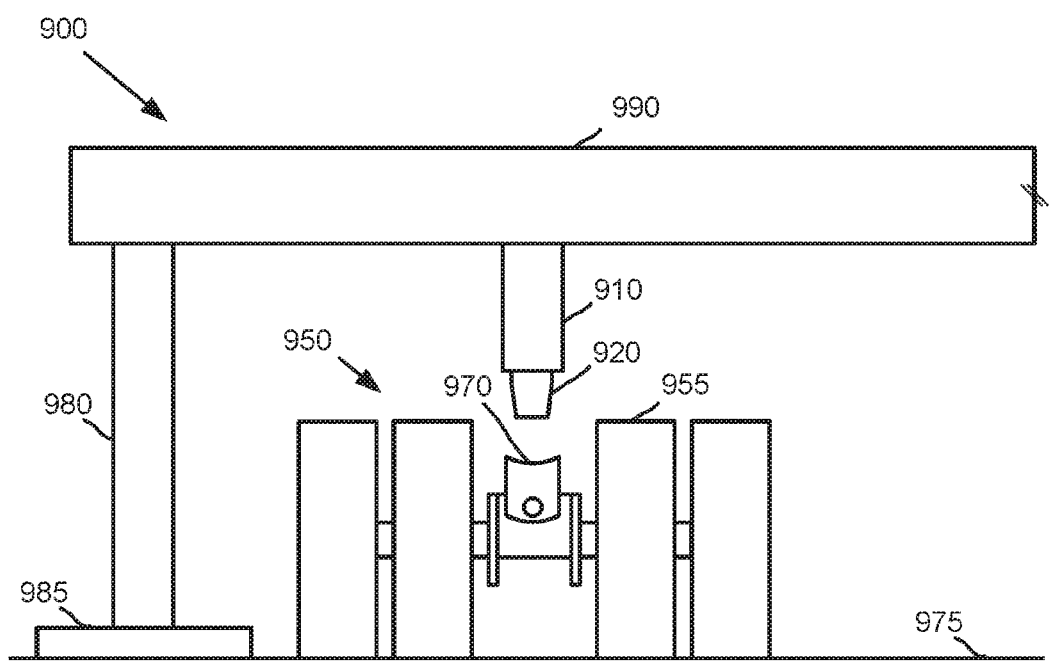
FIG. 11 illustrates the example load transport system of FIG. 10 with a disconnected axle assembly.

FIG. 11A illustrates the example load transport system 900 of FIG. 10 with a disconnected axle assembly 950. Lift cylinder rod 920 may be disconnected from a coupling system 970 prior to withdrawing lift cylinder rod 920 into a lift cylinder of the lift device 910. In some examples, coupling system 970 may be configured similarly to one or more of the coupling systems illustrated and described at FIGS. 2-9.

Prior to disconnecting lift cylinder rod 920 from coupling system 970, one or more support struts 980 may be configured to support the weight of platform 990. Support strut 980 may comprise a base foot 985 that contacts the ground 975 or other support surface. With the one or more support struts 980 in place, lift cylinder rod 920 may be disconnected from coupling system 970 while maintaining platform 990 in the same elevated position with respect to the ground 975. Once lift cylinder rod 920 has been disconnected, axle assembly 950 may be moved out from under one or both of lift device 910 and platform 990.

Removal of axle assembly 950 may facilitate access to lift device 910 for purposes of repair, maintenance, or replacement. In some examples, the same axle assembly 950 may be reconnected to a repaired or replaced lift device.

Figure 12A:
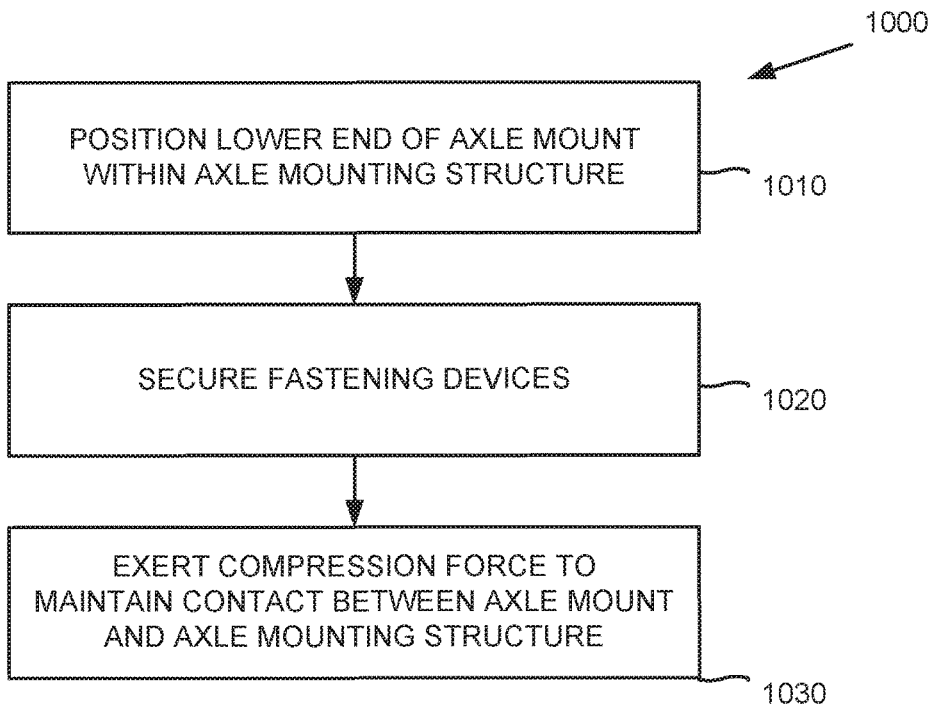
FIGS. 12A and 12B illustrate an example process associated with removably attaching an axle assembly to an axle mount and an example process for removing the axle assembly.
Figure 12B:
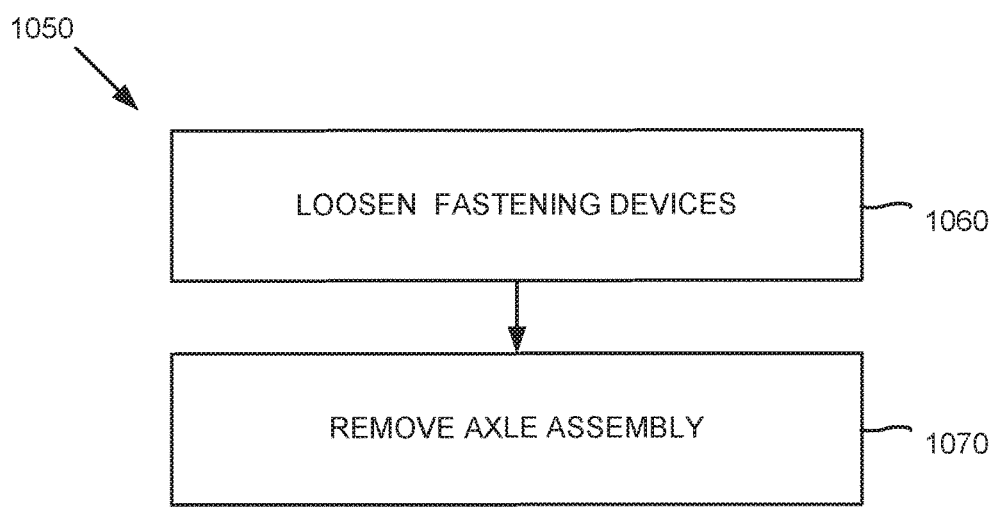

FIGS. 12A and 12B illustrate an example process 1000 associated with removably attaching an axle assembly to an axle mount and an example process 1050 for removing the axle assembly. At operation 1010, a lower end of the axle mount may be positioned within an axle mounting structure. The axle mounting structure may comprise an inner surface aligned with a non-vertical tapered surface of the axle mount.

At operation 1020, the process may comprise securing one or more fastening devices attached to a clamping structure. In some examples, the axle mount may comprise a cylinder rod associated with a hydraulic lift cylinder, and the clamping structure may be positioned beneath the cylinder rod. Securing the one or more fastening devices may comprise mounting a plurality of bolts to a bottom surface of the cylinder rod. The plurality of bolts may pass through the clamping structure and into the bottom surface of the cylinder rod.

At operation 1030, a compression force may be exerted, such as by the clamping structure, to maintain contact between the tapered surface of the axle mount and the inner surface of the axle mounting structure. The compression force may result from securing the one or more fastening devices. In some examples, the clamping structure may comprise a plate located above the axle mounting structure, and a through-hole of the plate may be configured to provide a seat for the axle mount. Securing the one or more fastening devices may comprise coupling the plate to the axle mounting structure with a plurality of bolts.

At operation 1060 of removal process 1050, the fastening devices may be loosened and/or detached. For example, one or more bolts may be unscrewed from the clamping structure and/or from the bottom surface of a cylinder rod. Loosening the fastening devices may result in the removal of the compression force that otherwise maintained contact between the tapered surface of the axle mount and the inner surface of the axle mounting structure.

At operation 1070, with the fastening devices having been loosened, the axle assembly may be removed from the axle mount.

Figure 13:
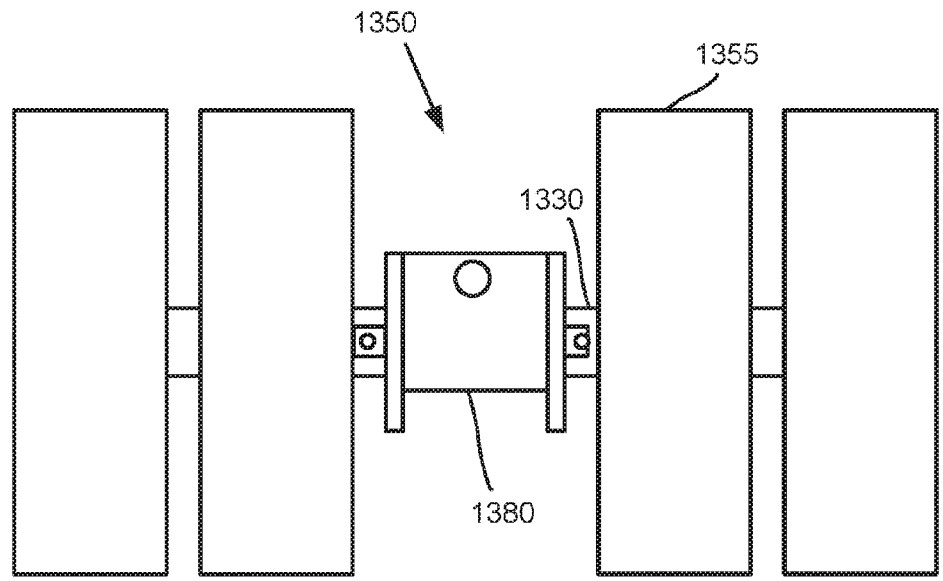
FIG. 13 illustrates a front view of an example axle assembly comprising an axle attached to an axle mount.

FIG. 13 illustrates a front view of an example axle assembly 1350 comprising an axle 1330 attached to an axle mount frame 1380. In some examples, the axle mount frame 1380 may be connected to a load bearing frame or platform, such as load bearing support structure 290 (FIG. 2) and/or platform 110 (FIG. 1). The axle assembly 1350 may comprise a number of wheels 1355 rotationally mounted on axle 1330.

Figure 14:
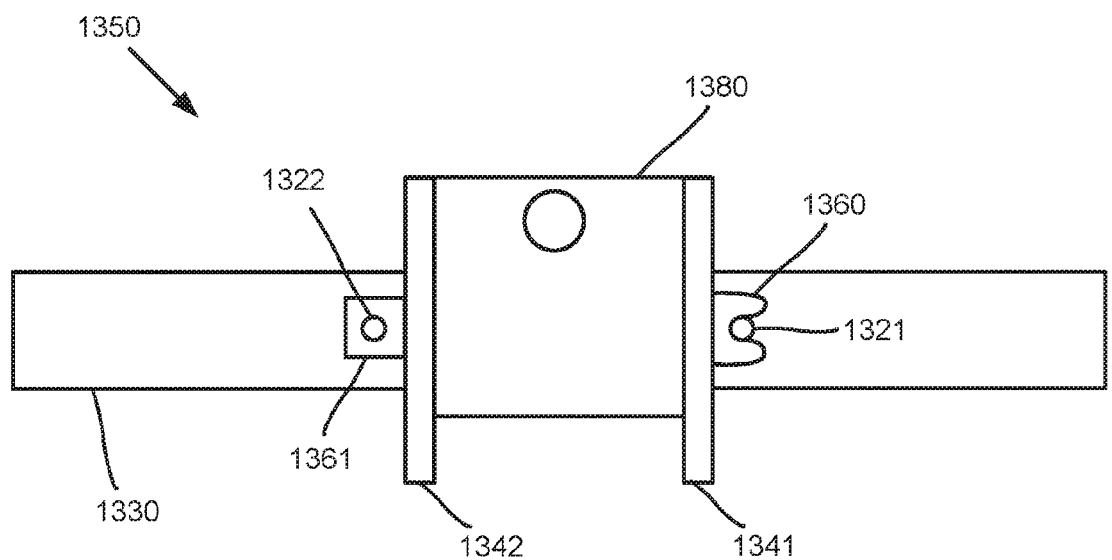
FIG. 14 illustrates a close up view of the example axle assembly of FIG. 13 with the axle located by one or more position devices.

FIG. 14 illustrates a close up view of the example axle assembly 1350 of FIG. 13 with the axle 1330 located by one or more position devices. The position devices may comprise a first axle mounting pin 1321 and a second axle mounting pin 1322. Axle mount frame 1380 may comprise a positional mounting structure 1360 configured to receive first axle mounting pin 1321. Additionally, axle mount frame 1380 may comprise one or more axle mounting structures, such as a first axle mounting structure 1361, configured to receive second axle mounting pin 1322. First and second axle mounting pins 1321, 1322 may project out from a surface of axle 1330 and pass at least partially pass through positional mounting structure 1360 and first axle mounting structure 1361, respectively.

Positional mounting structure 1360 may comprise a partial opening into which first axle mounting pin 1321 is located in order to position axle mount frame 1380 relative to axle 1330. First axle mounting structure 1361 may comprise a through hole into which second axle mounting pin 1322 may be located after positioning axle mount frame 1380 relative to the first axle mounting pin 1321. Positional mounting structure 1360 may be configured to account for any tolerance build up in axle mount frame 1380 relative to the location of first and second axle mounting pins 1321, 1322. For example, the partial opening of positional mounting structure 1360 may be configured to allow for positional adjustment of positional mounting structure 1360 relative to first axle mounting pin 1321 when assembling the axle mount frame 1380 to axle 1330.

Positional mounting structure 1360 may be welded or otherwise rigidly attached to a first trunnion plate 1341 of axle mount frame 1380. Additionally, first axle mounting structure 1361 may be welded or otherwise rigidly attached to a second trunnion plate 1342 of axle mount frame 1380. By locating positional mounting structure 1360 and first axle mounting structure 1361 at first and second axle mounting pins 1321, 1322, the position of axle mount frame 1380 may be substantially fixed with respect to axle 1330 both longitudinally and rotationally.

Figure 15:
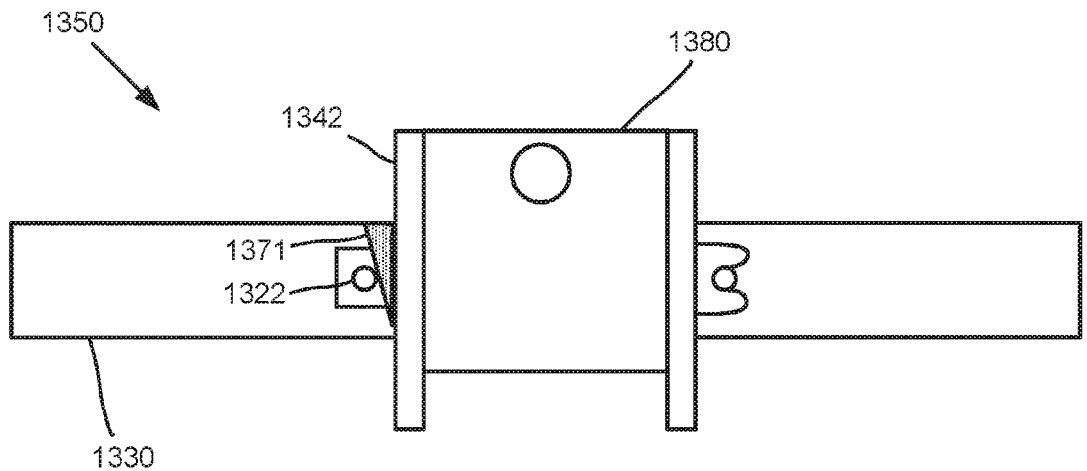
FIG. 15 illustrates the example axle assembly of FIG. 14 with an axle adjustment device located between a position device and the axle mount.

FIG. 15 illustrates the example axle assembly 1350 of FIG. 14 with an axle adjustment device, such as a wedge 1371, located between the second axle mounting pin 1322 and the second trunnion plate 1342 of the axle mount frame 1380. In some examples, wedge 1371 may be driven, pressed, pushed, or otherwise inserted into the space between the second axle mounting pin 1322 and the second trunnion plate 1342. Wedge 1371 may comprise an inclined surface that contacts second axle pin 1322. In the installed position, wedge 1371 may be configured to exert a substantially inward or compressive force against second trunnion plate 1342.

Figure 16:
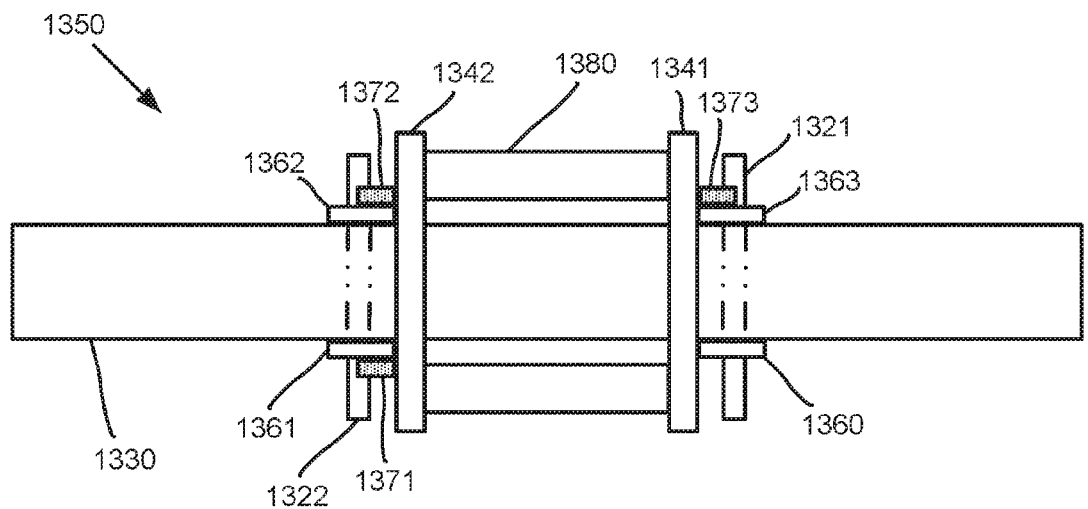
FIG. 16 illustrates a top view of the example axle assembly of FIG. 14 with a plurality of axle adjustment devices.

FIG. 16 illustrates a top view of the example axle assembly 1350 of FIG. 14 with a plurality of axle adjustment devices. The axle adjustment devices may comprise one or more wedges inserted between at least one of the position devices and the axle mount frame 1380. In some examples, one or both of first and second axle mounting pins 1321, 1322 may pass completely through axle 1330. In other examples, one or both of first and second axle mounting pins 1321, 1322 may comprise bosses that project from the outer surface of axle 1330.

First axle mounting structure 1361 may be located at or near a first end of second axle mounting pin 1322, and a second axle mounting structure 1362 may be located at or near a second end of second axle mounting pin 1322 on an opposite side of axle 1330. A second wedge 1372 may be inserted between the second axle mounting pin 1322 and the second trunnion plate 1342 of the axle mount frame 1380, similar to wedge 1371. The second wedge 1372 may be located adjacent second axle mounting structure 1362.

Positional mounting structure 1360 may be located at or near a first end of first axle mounting pin 1321, and a third axle mounting structure 1363 may be located at or near a second end of first axle mounting pin 1321 on an opposite side of axle 1330. A third wedge 1373 may be inserted between the first axle mounting pin 1321 and the first trunnion plate 1341 of the axle mount frame 1380. The third wedge 1373 may be located adjacent third axle mounting structure 1363.

One or both of second axle mounting structure 1362 and third axle mounting structure 1363 may be configured similarly as first axle mounting structure 1361, namely to include a through-hole. In other examples, one or both of second axle mounting structure 1362 and third axle mounting structure 1363 may be configured similarly as positional axle mounting structure 1360, namely to include a partial opening that may be configured to account for any tolerance build up between axle mount frame 1380 and the positions of first and second axle mounting pins 1321, 1322.

First wedge 1371 and second wedge 1372 may be welded or otherwise rigidly attached to second trunnion plate 1342 once the position of axle mount frame 1380 has been finally determined with respect to axle 1330. Similarly, third wedge 1373 may be welded or otherwise rigidly attached to first trunnion plate 1341. By positioning and affixing the wedges to axle mount frame 1380, the axial load placed on axle 1330 may be substantially evenly transferred to positional mounting structure 1360 and the three axle mounting structures 1361, 1362, 1363.

The positional adjustment of axle mount frame 1380 relative to axle 1330 may only need to be completed during an initial installation of axle assembly 1350. For example, the plurality of wedges may remain rigidly attached to the first and second trunnion plates 1341, 1342 during any subsequent assembly and/or disassembly of the axle assembly 1350.

When removing axle 1330 from axle mount frame 1380, one or both of first and second axle mounting pins 1321, 1322 may be at least partially removed or withdrawn from axle 1330. For example, with first axle mounting pin 1321 withdrawn from axle 1330, axle 1330 may be slid or otherwise moved longitudinally in order to disengage the second axle mounting pin 1322 from first axle mounting structure 1361 and from second axle mounting structure 1362. With the axle mounting structures disengaged from the axle mounting pins, axle 1330 may be disconnected and/or separated from axle mount frame 1380.

Figure 17A:
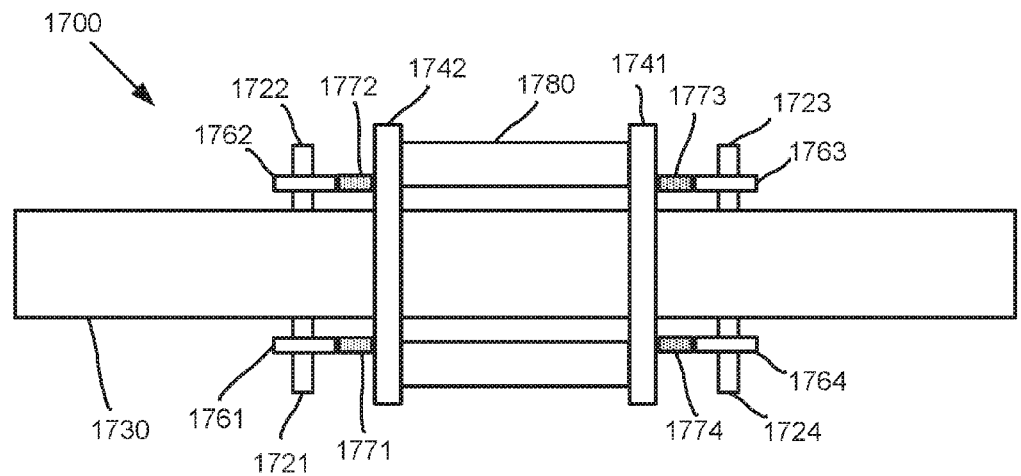
FIG. 17A illustrates a top view of an example axle assembly comprising one or more axle position adjustment devices.

FIG. 17A illustrates a top view of an example axle assembly 1700 comprising one or more axle position adjustment devices. An axle mount frame 1780 may be installed on an axle 1730. For example, axle mount frame 1780 may be slid onto the approximate center of axle 1730 during an assembly process.

One or more position devices may project from the surface of axle 1730. For example, a first position device 1721 may be located on an opposite side of axle 1730 as a second position device 1722. Both the first and second position devices 1721, 1722 may be located near one end of axle mount frame 1780. Similarly, a third position device 1723 and a fourth position device 1724 may project from the surface of axle 1730 near the other end of axle mount frame 1780. Axle mount frame 1780 may comprise a first trunnion plate 1741 and a second trunnion plate 1742.

One or more axle adjustment devices may be configured to adjust the position of the axle 1730 relative to axle mount frame 1780. For example, a first axle adjustment device 1771 may be inserted between first trunnion plate 1742 and first position device 1721. First position device 1721 may comprise an engagement apparatus 1761. Engagement apparatus 1761 may be configured to provide a bearing surface that contacts first axle adjustment device 1771. One or more additional engagement devices 1762, 1763, 1764 may similarly be configured to contact other axle adjustment devices.

The one or more axle adjustment devices 1771, 1772, 1773, 1774 may be configured to ensure that the axle 1730 is securely coupled to axle mount frame 1780 by applying a bi-directional, inward directing, and/or compressive force against both ends of axle mount frame 1780. For example, third and fourth axle adjustment devices 1773, 1774 may be configured to exert an inward force against first trunnion plate 1741. Similarly, first and second axle adjustment devices 1771, 1772 may be configured to exert an inward force against second trunnion plate 1742. In some examples, one or more of the components may be welded to each other.

Figure 17B:
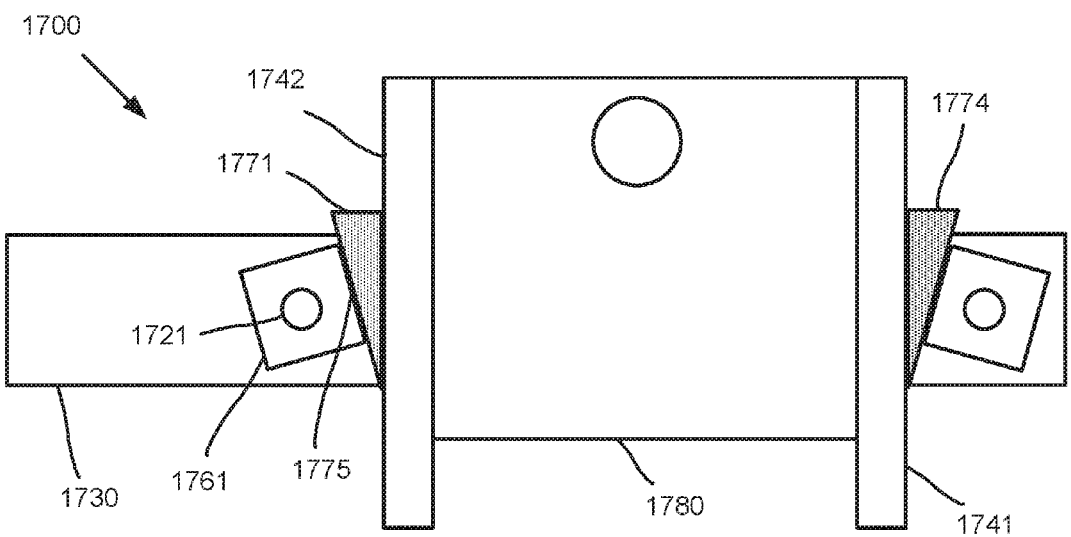
FIG. 17B illustrates an enlarged partial side view of the example axle assembly of FIG. 17A.

FIG. 17B illustrates an enlarged partial side view of the example axle assembly 1700 of FIG. 17A. One or more axle adjustment position assemblies, such as fourth axle adjustment device 1774, may be configured as a positional mounting structure to locate an initial position of the axle 1730 relative to the axle mount frame 1780. For example, fourth axle adjustment device 1774 may provide a bearing surface that presses up against the exterior surface of first trunnion plate 1741.

In some examples, first axle adjustment device 1771 may be inserted between the first position device 1721 and the second trunnion plate 1742 after the fourth axle adjustment device 1774 has already been positioned adjacent first trunnion plate 1741. The first engagement apparatus 1761 may be configured to rotate relative to first position device 1721. The rotation of first engagement apparatus 1761 may form a contact surface which is aligned with an inclined surface 1775 of first axle adjustment device 1771.

First axle adjustment device 1771 may be configured to press the axle mount frame 1780 against the fourth axle adjustment device 1774 when the first axle adjustment device 1771 is placed in contact with first position device 1721 via the first engagement device 1761. When the axle assembly 700 is assembled, fourth axle adjustment device 774 may be configured to prohibit relative movement between the axle 1730 and the axle mount frame 1780 in a first longitudinal directional along the rotational axis of the axle assembly 1700. Similarly, first axle adjustment device 1771 may be configured to prohibit relative movement between the axle 1730 and the axle mount frame 1780 in a second or opposite longitudinal directional.

Axle assembly 1700 may be configured to constrain the longitudinal and rotational position of the axle mount frame 1780 relative to the axle 1730 at the selected position. In some examples, one or more of the axle adjustment devices may be welded to the axle mount frame 1780 and/or to one or more of the position devices in the selected position.

Figure 18A:
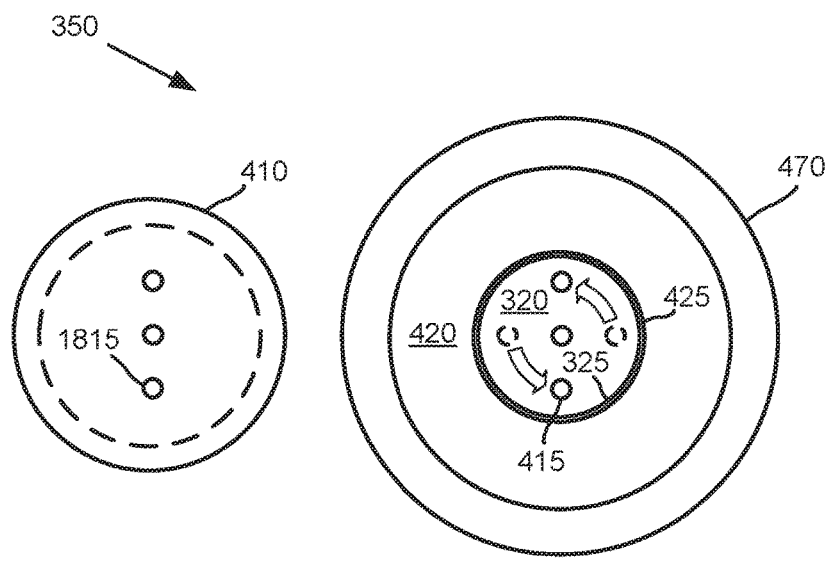
FIG. 18A illustrates a plan view of the example axle assembly of FIG. 4.
Figure 18B:
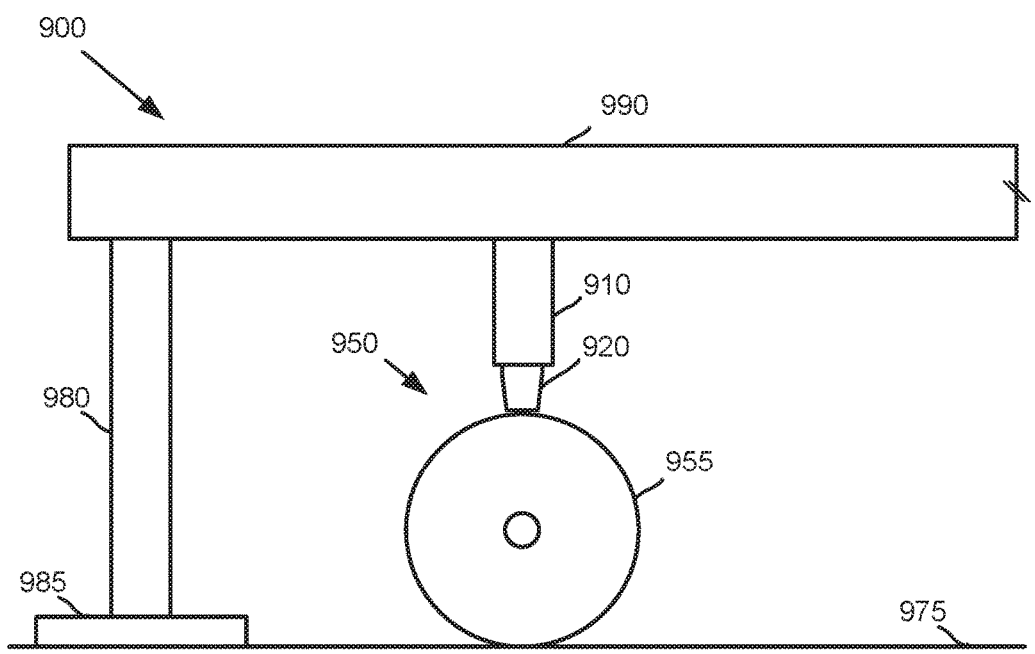
FIG. 18B illustrates the example load transport system of FIG. 11 with the disconnected axle assembly rotated ninety degrees.

FIG. 18 illustrates a bottom plan view of the example axle assembly 350 of FIG. 4 partially disconnected from the lift cylinder rod 320 or other type of axle mount. Axle mount frame 340 is omitted from the bottom plan view for clarity. Clamping plate 410 is shown having been disconnected from the lower end of lift cylinder rod 320 following the removal of fasteners 315 (FIG. 3) from mounting holes 415.

With axle assembly 350 and coupling apparatus 470 partially disconnected from lift cylinder rod 320, the tapered surface 325 of lift cylinder rod 320 may rotate relative to the angled surface 425 of mounting structure 420. In practice, the axle assembly 350 including mounting structure 420 and coupling apparatus 470 may rotate with respect to lift cylinder rod 320, however for purposes of illustration lift cylinder rod 320 is shown in a rotated position to illustrate the relative change in position of mounting holes 415 with respect to mounting structure 420. In some examples, axle assembly 350 may be rotated ninety degrees with respect to the lift cylinder rod 320, such that mounting holes 415 will also be placed at a ninety degree angle of rotation with respect to mounting structure 420.

Clamping plate 410 may be positioned relative to lift cylinder rod 320 such that mounting holes 815 associated with clamping plate 410 align with mounting holes 415 when axle assembly 350 is reattached to lift cylinder rod 320 in the rotated position. Mounting holes 415, 815 are each shown as including three holes, however other numbers of holes may similarly be used to removably attach axle assembly 350 to lift cylinder rod 320.

FIG. 11B illustrates the example load transport system 900 of FIG. 11A with the disconnected axle assembly 950 rotated ninety degrees with respect to platform 990. In some examples, one or both of axle assembly 950 and lift cylinder rod 920 may be configured similarly as axle assembly 350 and lift cylinder rod 320 illustrated in FIG. 18. With axle assembly 950 rotated ninety degrees and reattached to lift apparatus 910, the wheels 955 may be configured to allow load transport system 900 to be moved in a perpendicular direction as compared to the assembled load transport system 900 illustrated in FIG. 10.

Support strut 980 may be configured to support the weight of platform 990 on base foot 985 to facilitate the rotation of axle assembly 950 with respect to lift cylinder rod 920. Once lift cylinder rod 920 has been reattached to the rotated axle assembly 950, support strut 980 may be removed out from under platform 990 or retracted.

FIG. 19 illustrates a side view of an example load transport apparatus 1900 with a multi-axle assembly 1950.

Load transport apparatus 1900 may comprise a support structure 1990 operably coupled to multi-axle assembly 1950. In some examples, a trailer hitch 1952 or kingpin may be configured to operably couple the load transport apparatus 1900 to a tractor, a semi-truck, a load dividing jeep, or other types of towing vehicles during a transport operation.

Support structure 1990 may be supported on a transport surface 1905 by one or more landing gear 1975, 1985. The landing gear may comprise one or more hydraulic cylinders 1940, 1980. Hydraulic cylinders 1940, 1980 may be configured to raise or lower the support frame 1990, such as during the coupling or uncoupling of the load transport apparatus 1900 to a towing vehicle.

Multi-axle assembly 1950 may be configured to move load transport apparatus 1900 in a generally longitudinal direction of travel 1995 associated with support structure 1990. Multi-axle assembly 1950 may be located at the front of support structure 1990 and a second axle assembly may be attached to the back 1970 of support structure 1990 when load transport apparatus is being moved by a towing vehicle. Load transport apparatus 1900 may be configured to travel forwards or backwards, as well as turn, in the longitudinal direction of travel 1995, similar to a conventional tractor-trailer. One or more wheels associated with multi-axle assembly 1950 may be configured to support the load bearing frame 1990 on transport surface 1905.

Multi-axle assembly 1950 may be operably coupled to load bearing frame 1990 by an axle frame 2090. Axle frame 2090 may be rigidly attached to load bearing frame 1990 by a plurality of securing devices, such as bolts or clamping devices. Additionally, multi-axle assembly 1950 may be operably coupled to axle frame 2090 by an axle mount 1910.

In some examples, landing gear 1975, 1985 may comprise a walking system for moving load transport apparatus 1900 relatively short distances, for example between two well heads located in an oil field. Load transport apparatus 1900 may be configured to operate as a drilling platform when supported on landing gear 1975, 1985. On the other hand, load transport apparatus 1900 may be configured to be moved over relatively long distances with multi-axle assembly 1950 attached to a towing vehicle.

FIG. 20 illustrates a bottom plan view of the multi-axle assembly 1950 of FIG. 19 operably coupled to a towing apparatus 2050 in a first travel configuration 2000. Towing apparatus 2050 may be operably coupled to axle frame 2090 by a frame mount 2060. Towing apparatus 2050 may comprise and/or be attached to a trailer, a tractor, a semi-truck, a tow-truck, a load dividing jeep, other types of towing devices, or any combination thereof. Multi-axle assembly 1950 may be transported separately from support structure 1990 (FIG. 19).

Multi-axle assembly 1950 may comprise a first axle assembly 2010 operably coupled to axle frame 2090 by axle mount 1910 (shown in dashed hidden lines). First axle assembly 2010 may be operably coupled to a first arm 2055 of towing apparatus 2050 by a first draw bar 1955. In some examples, first draw bar 1955 may comprise one or more trailer hitches or kingpins, such as trailer hitch 1952 (FIG. 19), that operably couple to first arm 2055.

Additionally, multi-axle assembly 1950 may comprise a second axle assembly 2020 operably coupled to axle frame 2090 by a second axle mount 1920 (shown in dashed hidden lines). Second axle assembly 2020 may be operably coupled to a second arm 2056 of towing apparatus 2050 by a second draw bar 1956. In some examples, second draw bar 1956 may comprise one or more trailer hitches or kingpins, such as trailer hitch 1952 (FIG. 19). First and second draw bars 1955, 1956 may be configured to maintain a substantially perpendicular configuration between axle frame 2090 and the longitudinal direction of travel 1995 associated with support structure 1990 (FIG. 19).

Axle frame 2090 may comprise one or more mounting plates, such as a first mounting plate 2070 and a second mounting plate 2080. First and second mounting plates 2070, 2080 may be configured to operably couple to load bearing frame 1990 (FIG. 19) via one or more attaching devices 2072.

Towing apparatus 2050 may be configured to move multi-axle assembly 1950 in the direction of travel 1995 with first axle assembly 2010 and second axle assembly 2020 located in a side-by-side orientation in which a shared or common axis of rotation 2095 passes through both the first and second axle assemblies 2010, 2020. The common axis of rotation 2095 and the longitudinal length of axle frame 2090 may be substantially perpendicular to the direction of travel 1995. The first travel configuration 2000 of multi-axle assembly 1950 illustrated in FIG. 19 may be referred to as a side-by-side travel configuration.

Although first axle assembly 2020 and second axle assembly 2020 are each illustrated as including two wheels, each axle assembly may comprise one or more wheels. For example, four wheels associated with a single axle assembly may be aligned with the common axis of rotation 2095, with two wheels located on both sides of the axle mount, such as axle mount 1910. In some examples, the lateral width 2075 of multi-axle assembly 1950 positioned in the first travel configuration 2000 may be determined by the outer-most tires of the first and second axle assemblies 2010, 2020.

Figure 21:
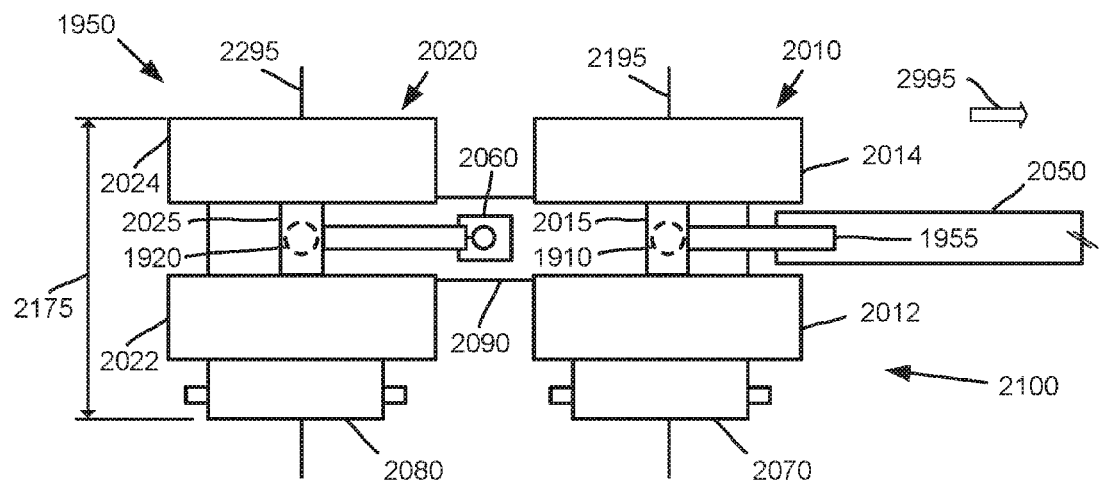
FIG. 21 illustrates the multi-axle assembly of FIG. 19 operably coupled to the towing apparatus in a second travel configuration.

FIG. 21 illustrates a bottom view of the multi-axle assembly 1950 of FIG. 19 operably coupled to towing apparatus 2050 in a second travel configuration 2100. Multi-axle assembly 1950 may be transported separately from support structure 1990 (FIG. 19) in the second travel configuration 2100. In some examples, multi-axle assembly 1950 may be self-propelled, such as by an on-board motor or engine, and therefore may not be coupled to a towing apparatus 2050 in order to move in the second travel configuration 2100.

First axle assembly 2010 may comprise a first axle 2015 operably coupled to two or more wheels 2012, 2014. Similarly, second axle assembly 2020 may comprise a second axle 2025 associated with two or more wheels 2022, 2024. In the second travel configuration 2100, first axle assembly 2010, including first axle 2015, may be oriented approximately ninety degrees relative to axle frame 2090. In some examples, first axle assembly 2010 may be configured to rotate about axle mount 1910 from the first travel configuration 2000 of FIG. 20 to the second travel configuration 2100. In other examples, axle mount 1910 may be configured to rotate relative to axle frame 2090.

Similarly, second axle assembly 2020, including second axle 2025, may be configured to rotate and/or be oriented approximately ninety degrees relative to axle frame 2090. With first and second axle assemblies 2020 oriented in the second travel configuration 2100, a first axis of rotation 2195 associated with first axle 2015 may be substantially perpendicular to a direction of travel 2995 of the multi-axle assembly 1950. The direction of travel 2995 associated with the second travel configuration 2100 may be referred to as a transverse direction of travel as compared to the generally longitudinal direction of travel 1995 associated with support structure 1990, as illustrated in FIGS. 19 and 20.

Additionally, a second axis of rotation 2295 associated with second axle 2025 may be substantially parallel to, but offset from, first axis of rotation 2195. First axis of rotation 2195 may be spaced apart some distance from second axis of rotation 2295 along the length of axle frame 2090 in the direction of travel 2995.

In the second travel configuration 2100, axle frame 2090 may be aligned lengthwise with respect to the direction of travel 2995. The lateral width 2175 of multi-axle assembly 1950 positioned in the second travel configuration 2100 may be determined by the outer-most tire 2014 of the first axle assembly 2010 and the first mounting plate 2070. Alternatively, the lateral width 2175 of multi-axle assembly 1950 may be determined by the outer-most tire 2024 of the second axle assembly 2020 and the second mounting plate 2080. In other examples, a reduced lateral width may be achieved by utilizing a shorter mounting plate, in which case lateral width 2175 may instead be determined by two tires located on the same axle, such as wheels 2022, 2024.

In the second travel configuration 2100, wheel 2012 associated with first axle 2015 may be oriented in-line with wheel 2022 associated with second axle 2025. Similarly, wheel 2014 may be oriented in-line with wheel 2024. Accordingly, the second travel configuration 2100 may be referred to as an in-line travel configuration. In various examples, the lateral width 2175 associated with the second travel configuration 2100 may be substantially less than the lateral width 2075 associated with the first travel configuration 2000 illustrated in FIG. 20. For example, by reconfiguring the multi-axle assembly 1950 in the second travel configuration 2100, the lateral width 2175 may be approximately equal to, or less than half of, the lateral width 2075 associated with the first travel configuration 2000.

First draw bar 1955 may be configured to rotate together with first axle assembly 2010, such that first draw bar 1955 may similarly be rotated ninety degrees from the first travel configuration 2000. In some examples, first axle assembly 2010 and first draw bar 1955 may be configured to rotate more than ninety degrees. With multi-axle assembly 1950 positioned in the second travel configuration 2100, first draw bar 1955 may remain substantially aligned along the direction of travel 2995 towing. In some examples, first draw bar 1955 may be operably coupled to towing apparatus 2050 so that multi-axle assembly 1950 may be towed by towing apparatus 2050 in the direction of travel 2995.

Whereas one or more of the examples are described as rotating one or more components by ninety degrees, or approximately ninety degrees, one of skill in the art would appreciate that varying amounts of rotation are contemplated herein, such that approximately ninety degrees may be understood to contemplate various ranges of rotational angle and achieve a similar result.

Figure 22:
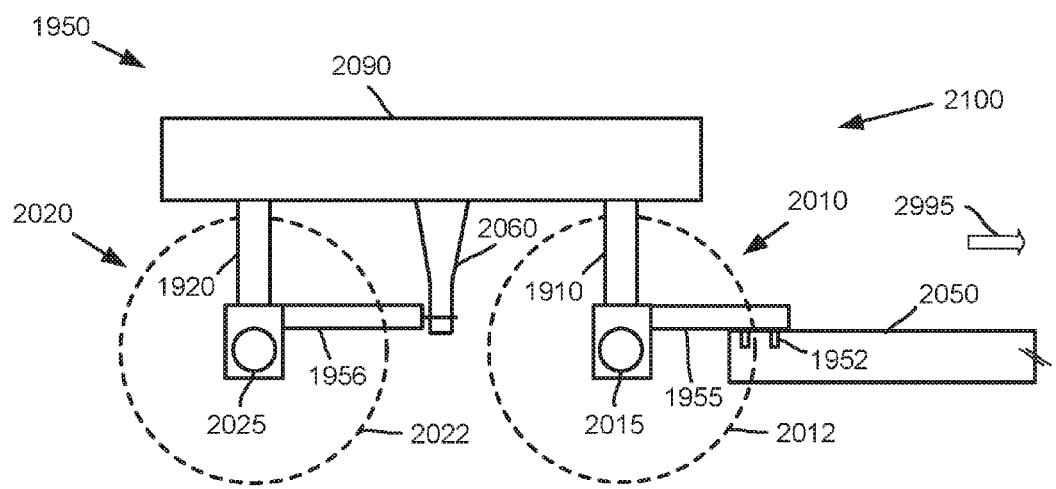
FIG. 22 illustrates a side view of the multi-axle assembly in the second travel configuration.

FIG. 22 illustrates a side view of the multi-axle assembly 1950. In the second travel configuration 2100, first draw bar 1955 is shown operably coupled to towing apparatus 2050 via one or more trailer hitches 1952. In some examples, first draw bar 1955 may be rigidly coupled to towing apparatus 2050, such that first axle assembly 2010 may be configured to rotate about axle mount 1910 during a turning operation, essentially making wheel 2012 and first axle assembly 2010 steerable. On the other hand, second draw bar 1956 may be operably coupled to frame mount 2060 in order to prohibit any unintentional rotation of second axle assembly 2020 about second axle mount 1920. Attaching second draw bar 1956 to frame mount 2060 may be configured to maintain the direction of rotation of wheel 2022 in-line with the axle frame 2090. In some examples, wheel 2022 and second axle 2025 may be non-steerable.

Figure 23A:
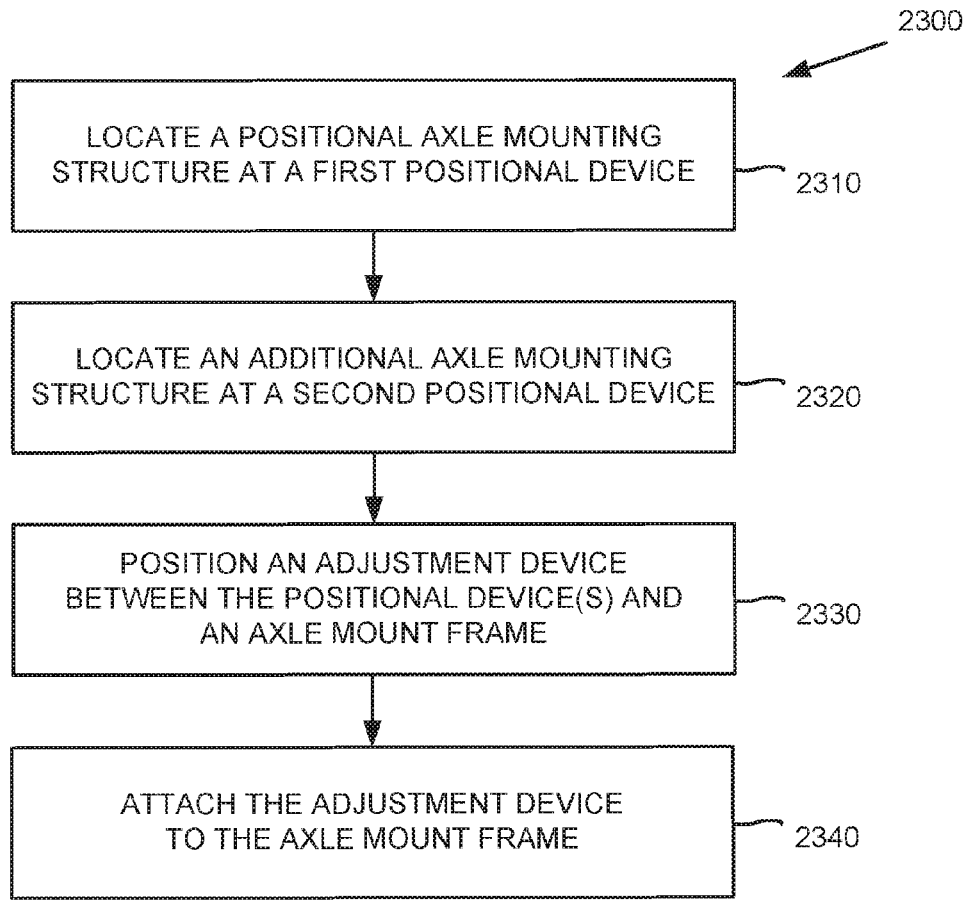
FIGS. 23A and 23B illustrate an example process 2300 associated with removably attaching an axle assembly and an example process 2350 for removing the axle assembly.
Figure 23B:
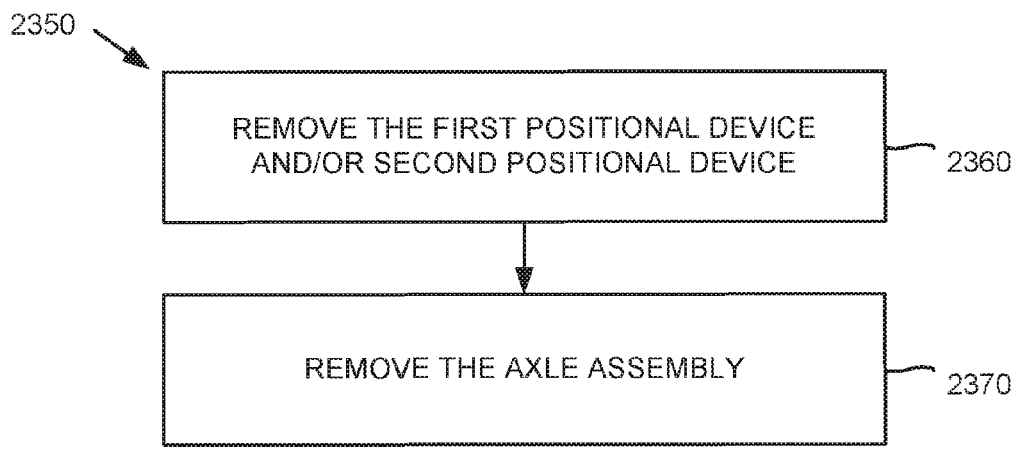

FIGS. 23A and 23B illustrate an example process 2300 associated with removably attaching an axle assembly and an example process 2350 for removing the axle assembly.

At operation 2310, a positional axle mounting structure may be located at a first positional device of the axle. The first positional device may comprise a first pin. The positional axle mounting structure may comprise a plate with a through hole sized to fit around the first pin with nominal clearance. The first pin may pass through the axle, such that first and second ends of the first pin project out of opposite sides of the axle.

At operation 2320, one or more additional axle mounting structures may be located at a second positional device of the axle. The one or more additional axle mounting structures may comprise partial or oversized openings that may be configured to compensate for or otherwise accommodate any tolerance build up in the axle assembly.

At operation 2330, one or more position adjustment devices may be positioned between the positional devices and the axle mount. In some examples, three position adjustment devices, such as wedges, may be positioned adjacent three axle mounting structures.

At operation 2340, the position adjustment device may be attached to an axle mount frame. The axle mount frame may comprise one or more trunnion plates, and the position adjustment device may be welded to the trunnion plate. The axle mount frame may be operably coupled to a load bearing frame or platform.

At operation 2360 of removal process 2350, one or both of the first and second positional devices may be at least partially removed from the axle.

At operation 2370, with the first and/or second positional devices having been at least partially removed, the axle may be removed from the axle mount frame.

Having described and illustrated various examples herein, it should be apparent that other examples may be modified in arrangement and detail. We claim all modifications and variations coming within the spirit and scope of the following claims.

The invention claimed is:

1. A multi-axle assembly, comprising:
an axle frame configured to move in a first travel configuration;
a first axle assembly attached to a first end of the axle frame, wherein the first axle assembly comprises a first axle rotationally coupled to one or more wheels;
a second axle assembly attached to a second end of the axle frame opposite the first end, wherein the second axle assembly comprises a second axle rotationally coupled to one or more wheels, and wherein a common axis of rotation passes through both the first axle and the second axle in the first travel configuration;
a first vertically extendable and retractable axle mount coupled at a first end to the first axle and rotatably coupled at a second opposite end to the axle frame to rotationally couple the first axle to the axle frame, wherein the first axle assembly is configured to be repositioned via the first axle mount to a second travel configuration in which the first axle is rotationally offset from the common axis of rotation in the second travel configuration; and
a second vertically extendable and retractable axle mount coupled at a first end to the second axle and rotatably coupled at a second opposite end to the axle frame to rotationally couple the second axle assembly to the axle frame, wherein the second axle assembly is configured to be repositioned via the second axle mount to the second travel configuration in which the second axle is rotationally offset from the common axis of rotation, and wherein the second axle is substantially parallel to and spaced apart from the first axle along a length of the axle frame in the second travel configuration.

2. The multi-axle assembly of claim 1, wherein vertical rotational axes of the first and second axle mounts maintain substantially a same vertical position relative to the axle frame in the first travel configuration and the second travel configuration.

3. The multi-axle assembly of claim 1, wherein the first axle and the second axle are steered in unison during a steering operation associated with the first travel configuration.

4. The multi-axle assembly of claim 3, wherein the first axle and the second axle remain substantially parallel to each other throughout the steering operation.

5. The multi-axle assembly of claim 1, wherein the first axle assembly is separately steerable from the second axle assembly in the second travel configuration.

6. The multi-axle assembly of claim 5, wherein the second axle assembly is non-steerable in the second travel configuration.

7. The multi-axle assembly of claim 1, wherein an overall width of the multi-axle assembly is measured transverse to a direction of travel of the multi-axle assembly, and wherein the overall width of the multi-axle assembly configured in the second travel configuration is approximately equal to, or less than half of, the overall width of the multi-axle assembly configured in the first travel configuration.

8. The multi-axle assembly of claim 1, wherein the first axle is configured to be decoupled from the first axle mount in order to be rotated from the first travel configuration to the second travel configuration, and wherein the first axle is recoupled to the first axle mount after being rotated to the second configuration.

9. The multi-axle assembly of claim 1, wherein at least a portion of the first axle mount is configured to be rotated relative to the axle frame in order to reposition the first axle assembly from the first travel configuration to the second travel configuration.

10. The multi-axle assembly of claim 9, wherein the first axle assembly remains coupled to the first axle mount while being repositioned from the first travel configuration to the second travel configuration.

11. A multi-axle assembly, comprising:
an axle frame configured to move in a first travel configuration associated with a transverse orientation of the axle frame relative to a direction of travel of the multi-axle assembly;
a first axle;
a second axle;
a first vertically extendable and retractable axle mount coupled at a first end to the first axle and rotatably coupled at a second opposite end to the axle frame, wherein the first axle is configured to be rotationally offset via the first axle mount to a second travel configuration; and
second vertically extendable and retractable axle mount coupled at a first end to the second axle and rotatably coupled at a second opposite end to the axle frame, wherein the second axle is configured to be rotationally offset via the second axle mount to the second travel configuration, and wherein the second travel configuration is associated with a substantially longitudinal orientation of the axle frame relative to the direction of travel.

12. The multi-axle assembly of claim 11, wherein the first axle and the second axle are located side-by-side to each other in the first travel configuration such that a common axis of rotation passes through both the first axle and the second axle.

13. The multi-axle assembly of claim 12, wherein both the first axle and the second axle are rotationally offset from the common axis of rotation by approximately ninety degrees in the second travel configuration.

14. The multi-axle assembly of claim 11, wherein a rotational axis of the second axle is parallel to and linearly spaced apart from a rotational axis of the first axle along a length of the axle frame in the second travel configuration.

15. The multi-axle assembly of claim 14, wherein the first axle and the second axle are rotated to a substantially in-line position with respect to each other along the length of the axle frame in reconfiguring the multi-axle assembly from the first travel configuration to the second travel configuration.

16. The multi-axle assembly of claim 11, wherein vertical rotational axes of the first axle and the second axle maintain substantially the same vertical positions in relation to the axle frame when moving between the first travel configuration and the second travel configuration.

17. The multi-axle assembly of claim 11, wherein the first axle is separately steerable from the second axle in the second travel configuration.

18. The multi-axle assembly of claim 17, wherein the second axle is non-steerable in the second travel configuration.

19. A method of moving a multi-axle assembly having a first axle assembly including a first axle rotatably attached about a first vertical axis to an axle frame and a second axle assembly including a second axle rotatably attached about a second vertical axis to the axle frame, wherein the method comprises:
in a first travel configuration associated with moving the multi-axle assembly in a direction of travel, moving the multi-axle assembly such that a common axis of rotation passes through both the first axle assembly and the second axle assembly;
rotationally offsetting the first axle assembly relative to the axle frame;
rotationally offsetting the second axle assembly relative to the axle frame; and
in a second travel configuration associated with moving the multi-axle assembly with a length of the axle frame oriented in a substantially longitudinal orientation relative to the direction of travel, moving the multi-axle assembly such that a first axis of rotation associated with the rotationally offset first axle assembly is parallel to and spaced apart along the length of the axle frame from a second axis of rotation associated with the rotationally offset second axle assembly, wherein the first vertical axis of the first axle and the second vertical axis of the second axle maintain the same positions relative to the axle frame when moving between the first travel configuration and the second travel configuration.

20. The method of claim 19, wherein both the first axle assembly and the second axle assembly are rotationally offset approximately ninety degrees relative to the axle frame when the multi-axle assembly is reconfigured from the first travel configuration to the second travel configuration.

* * * * *